(12) United States Patent
van Riel et al.

(10) Patent No.: US 8,338,540 B2
(45) Date of Patent: Dec. 25, 2012

(54) POLYMERIC COMPOSITIONS AND PROCESSES FOR MOLDING ARTICLES

(75) Inventors: Norwin van Riel, Aardenburg (NL); Pascal E. R. E. J. Lakeman, Bergen Op Zoom (NL)

(73) Assignee: Dow Global Technologies LLC, Midland, MI (US)

( * ) Notice: Subject to any disclaimer, the term of this patent is extended or adjusted under 35 U.S.C. 154(b) by 587 days.

(21) Appl. No.: 12/256,217

(22) Filed: Oct. 22, 2008

(65) Prior Publication Data

US 2009/0105404 A1    Apr. 23, 2009

Related U.S. Application Data

(60) Provisional application No. 60/981,658, filed on Oct. 22, 2007.

(51) Int. Cl.
*C08L 23/00* (2006.01)
*C08L 23/04* (2006.01)
*C08L 51/00* (2006.01)
*A61K 8/34* (2006.01)

(52) U.S. Cl. ........................... 525/240; 524/529

(58) Field of Classification Search ............... 525/240; 524/451, 442, 529
See application file for complete search history.

(56) References Cited

U.S. PATENT DOCUMENTS

| | | | |
|---|---|---|---|
| 4,076,698 A * | 2/1978 | Anderson et al. | 526/348.6 |
| 4,113,806 A * | 9/1978 | Watson et al. | 525/210 |
| 4,461,872 A * | 7/1984 | Su | 525/240 |
| 4,540,753 A | 9/1985 | Cozewith et al. | |
| 5,272,236 A | 12/1993 | Lai et al. | |
| 5,278,272 A | 1/1994 | Lai et al. | |
| 5,283,267 A * | 2/1994 | Nishio et al. | 523/216 |
| 5,346,963 A * | 9/1994 | Hughes et al. | 525/285 |
| 5,504,172 A | 4/1996 | Imuta et al. | |
| 5,514,745 A * | 5/1996 | Yoshino | 524/494 |
| 5,599,865 A * | 2/1997 | Koizumi et al. | 524/413 |
| 5,834,056 A | 11/1998 | Lutz | |
| 5,916,953 A | 6/1999 | Jacoby et al. | |
| 6,180,709 B1 * | 1/2001 | Nishio et al. | 524/451 |
| 6,300,419 B1 * | 10/2001 | Sehanobish et al. | 525/191 |
| 6,403,692 B1 | 6/2002 | Traugott et al. | |
| 6,498,214 B2 | 12/2002 | Laughner et al. | |
| 6,525,157 B2 | 2/2003 | Cozewith et al. | |
| 6,569,934 B2 | 5/2003 | Noel, III | |
| 6,582,829 B1 | 6/2003 | Quinn et al. | |
| 6,683,125 B1 * | 1/2004 | Augestad et al. | 524/490 |
| 6,750,284 B1 * | 6/2004 | Dharmarajan et al. | 524/515 |
| 6,774,186 B2 * | 8/2004 | Walton | 525/191 |
| 6,906,160 B2 * | 6/2005 | Stevens et al. | 526/326 |
| 6,949,605 B2 | 9/2005 | Shankernarayanan et al. | |
| 7,056,982 B2 * | 6/2006 | Datta et al. | 525/240 |
| 7,087,680 B2 | 8/2006 | Pierini et al. | |
| 7,157,522 B2 * | 1/2007 | Datta et al. | 525/240 |
| 7,235,606 B2 | 6/2007 | Spencer et al. | |
| 7,244,783 B2 | 7/2007 | Lean et al. | |
| 7,476,710 B2 * | 1/2009 | Mehta et al. | 525/191 |
| 7,619,038 B2 * | 11/2009 | Mehta et al. | 525/191 |
| 7,732,521 B2 * | 6/2010 | Wevers et al. | 524/451 |
| 7,803,876 B2 * | 9/2010 | Yeh et al. | 525/198 |
| 7,855,258 B2 * | 12/2010 | Datta et al. | 526/160 |
| 7,897,093 B2 * | 3/2011 | Jones et al. | 264/328.8 |
| 2003/0204017 A1 | 10/2003 | Stevens et al. | |
| 2004/0198912 A1 * | 10/2004 | Dharmarajan et al. | 525/240 |
| 2004/0249080 A1 | 12/2004 | Shankernarayanan et al. | |
| 2005/0107534 A1 * | 5/2005 | Datta et al. | 525/191 |
| 2005/0288393 A1 | 12/2005 | Lean et al. | |
| 2006/0189762 A1 * | 8/2006 | Datta et al. | 525/240 |
| 2007/0010616 A1 | 1/2007 | Kapur et al. | |
| 2007/0066756 A1 | 3/2007 | Poon et al. | |
| 2007/0087193 A1 * | 4/2007 | Lee et al. | 428/364 |
| 2007/0117909 A1 | 5/2007 | Seliskar et al. | |
| 2007/0155905 A1 * | 7/2007 | Drewniak et al. | 525/240 |
| 2007/0191532 A1 | 8/2007 | De Kock et al. | |
| 2007/0203273 A1 | 8/2007 | Van Riel et al. | |
| 2007/0207303 A1 | 9/2007 | Lee et al. | |
| 2007/0292693 A1 * | 12/2007 | Parkinson et al. | 428/411.1 |
| 2009/0105397 A1 | 4/2009 | Van Riel et al. | |
| 2009/0111347 A1 * | 4/2009 | Peng et al. | 442/334 |
| 2009/0304968 A1 * | 12/2009 | De Palo et al. | 428/36.91 |
| 2010/0210775 A1 * | 8/2010 | Stack et al. | 524/420 |
| 2010/0210780 A1 * | 8/2010 | Sugimoto | 524/451 |

FOREIGN PATENT DOCUMENTS

| | | |
|---|---|---|
| CN | 1408012 A | 4/2003 |
| EP | 129368 A1 | 12/1984 |
| EP | 0495099 A1 | 7/1992 |
| EP | 1057864 A1 | 12/2000 |
| GB | 2312427 A | 4/1997 |
| JP | 2001/206956 A | 7/2001 |
| KR | 20100039269 A | 12/1998 |
| WO | 01/142352 A1 | 6/2001 |
| WO | 2003/040201 A1 | 5/2003 |
| WO | 2005/090427 A2 | 9/2005 |
| WO | 2005/111145 A1 | 11/2005 |
| WO | WO 2005111145 A1 * | 11/2005 |
| WO | 2006/101932 A2 | 9/2006 |
| WO | 2006/101966 A1 | 9/2006 |
| WO | 2006/102154 A2 | 9/2006 |

(Continued)

OTHER PUBLICATIONS

Bikiaris et al. (Journal of Applied Polymer Science, vol. 81, 701-709, 2001).*

(Continued)

*Primary Examiner* — Liam Heincer

(74) *Attorney, Agent, or Firm* — Dorbrusin Thennisch PC

(57) ABSTRACT

The present invention is directed to polymeric article comprising a blend of (a) a first polymeric component; (b) a second polymeric component, the second polymeric component including a propylene elastomer or a substantially linear or linear ethylene polymer; and (c) at least one reinforcement material. The polymeric articles desirably have one or more of the following characteristics: a soft touch feel, a low gloss appearance, or a high surface durability.

53 Claims, No Drawings

FOREIGN PATENT DOCUMENTS

| | | |
|---|---|---|
| WO | 2006/102155 A2 | 9/2006 |
| WO | 2007/025663 A1 | 3/2007 |
| WO | 2007/082571 A1 | 8/2007 |
| WO | 2007/124303 A2 | 11/2007 |
| WO | 2008/100331 A1 | 8/2008 |

OTHER PUBLICATIONS

Williams et al., "The construction of a polyethylene calibration curve for gel permeation chromatography using polystyrene fractions", Journal of Polymer Science Part B: Polymer Letters, vol. 6:9 (1968) 621-4, John Wiley & Sons, Inc.

Rodriguez, F., *Principles of Polymer Systems*, $3^{rd}$ ed. Hemisphere Pub. Corp., NY (1989) 155-160.

L. Wild, et al., "Determination of branching distributions in polyethylene and ethylene copolymers", Journal of Polymer Science: Polymer, Physics Ed., 20 (1982) 441-455, John Wiley & Sons, Inc.

B. Wunderlich, *Macromolecular Physics*, vol. 3, (1980) 54, Academic Press, NY.

F. Rodriguez, *Principles of Polymer Systems*, $2^{nd}$ Ed., (1982) 54, Hemisphere Publishing Corporation, Washington.

Technical Data Sheet for DOW C705-44NA HP Polypropylene Resin, Natural Polypropylene Impact Copolymer p. 1-2 (Sep. 2005).

Technical Data Sheet for DOW H734-52RNA Polypropylene Resin, Natural Polypropylene Homopolymer, p. 1-2 (Sep. 2005).

International Search Report, PCT/US2008/080806, Mailing Date Feb. 2, 2009.

International Search Report, PCT/US2008/080814, Mailing Date Feb. 2, 2009.

Translation of Office Action from China intellectual Property Office for co-pending Chinese patent application No. 2008-80112714.4 dated Dec. 5, 2011.

\* cited by examiner

POLYMERIC COMPOSITIONS AND PROCESSES FOR MOLDING ARTICLES

CLAIM OF PRIORITY

The present application claims the benefit of U.S. Provisional Patent Application No. 60/981,658 (filed on Oct. 22, 2007) which is hereby incorporated by reference in its entirety for all purposes.

FIELD OF THE INVENTION

The present invention relates to an improved polyolefin composition and processes regarding the same. More particularly, the present invention relates to blended polyolefinic materials which after molding provide a high quality surface appearance and/or improved durability. Specifically, the present invention relates to polymeric compositions suitable for molding articles in color having with one, two, three, or even all of the following characteristics: low gloss, good gloss uniformity, highly durable surface quality and a soft-touch tactile feel.

BACKGROUND OF THE INVENTION

Much effort has been put into developing polymeric compositions that exhibit desirable properties, lower costs, or both. For some applications, it is desirable to improve one or more of the following: the tactile characteristics of the polymeric articles, the low gloss surface appearance, or the durability characteristics, For instance, vehicle passengers contact various automotive interior articles and it is desirable to employ a material for these articles that has a soft touch tactile sensation and is durable and withstanding frequent touching and scratching. Among the ways to impart a soft touch feel, low gloss appearance and high surface durability is to use a multi step process applying a secondary layer of functional material on top of a molded article through overmoulding, painting or other technique. Other ways to impart a soft touch feel, low gloss appearance and high surface durability is a modification of a thermoplastic material to suit the desired properties.

Examples of prior polymeric compositions and processes of forming those compositions are discussed in: U.S. Pat. Nos. 6,300,419; 6,949,605; 6,498,214, U.S. Patent Publication 2005/0288393, and WIPO Publication 2007/025663A1 all of which are hereby expressly incorporated by reference for all purposes.

U.S. Patent Application Publication No. 2007/0010616, PCT Application Nos. PCT/US2005/008917 (filed on Mar. 17, 2005), and PCT International Patent Application Publication Nos. WO2006/102155A2 (filed Mar. 15, 2006), WO2006/101966A1 (filed Mar. 15, 2006), WO2006101932A2 (filed Mar. 15, 2006), and WO2006102155A2 (filed Mar. 15, 2006), all of which are expressly incorporated herein by reference in there entirety, describe block (i.e., blocky) copolymers of a lower α-olefin (LOA) and a second α-olefin (i.e., LOA/α-olefin interpolymers such as ethylene/α-olefin interpolymers) which may be soft thermoplastics and blends with polypropylene having improved mechanical properties.

PCT International Patent Application Publication No. WO2003/040201 A1 (filed on May 6, 2002), published US Patent Application No. 2003/0204017 (filed on May 5, 2002), European Patent No. 0495099 (filed on Dec. 12, 1989), European Patent Application No. 129368 (filed on Jun. 5, 1984) and U.S. Pat. Nos. 6,525,157 (issued on Feb. 25, 2003), 6,403,692 (issued Jun. 11, 2002), and 5,272,236 (issued Dec. 21, 1993) all of which are expressly incorporated herein by reference in there entirety, describe linear or substantially linear ethylene polymers (S/LEP) which may be soft thermoplastics and polymeric blends including a S/LEP.

International Patent Application Publication WO 03/040201 A1 filed on May 6, 2002, published US Application No. 2003/0204017 filed on May 5, 2002, and U.S. Pat. No. 6,525,157 issued on Feb. 25, 2003, all of which are incorporated by reference, describe polypropylene elastomers which may be soft thermoplastics, and polymeric blends using a propylene elastomer.

Still, it remains desirable to provide a polymeric composition, particularly, a shaped thermoplastic polyolefin composition that can exhibit a relatively soft-touch feel and withstand the conditions encountered in vehicle interior applications, such as substantially low gloss, mar resistance, scratch resistance, low temperature ductility, dimensional stability, or any combination thereof. It would be particularly attractive to accomplish this without the need to use relatively high cost or highly processed (e.g., grafted) polymers, specialty fillers or agents, or other additional or alternative relatively costly ingredients, processes, multi-layered structures (such as coatings) or the like while still maintaining desirable characteristics.

SUMMARY OF THE INVENTION

In one aspect, the invention is directed a polymeric composition comprising a blend of a first polymeric component; a second polymeric component, the second polymeric component includes a relatively soft thermoplastic as compared with the first polymeric component, the second polymeric component selected from the group consisting of a propylene elastomer, a substantially linear or linear ethylene polymer (S/LEP), or both, wherein the S/LEP comprises an α-olefin comonomer having from 4 through 20 carbon atoms and having an ethylene concentration from about 40 wt. % to about 85 wt. % based on the total weight of the S/LEP, and the propylene elastomer includes propylene and one or more α-olefin comonomers having 2, or 4 through 20 carbon atoms and has a comonomer concentration less than about 20 wt. % based on the total weight of the propylene elastomer; and at least one reinforcement material.

This aspect of the invention may be further characterized by one or any combination of the following features: the polymeric composition has a ratio of the first polymeric component to the second polymeric component greater than about 10:42, the first polymeric component is present in the amount of about 3 wt. % to about 70 wt. % based on the total weight of the composition; the first polymeric component is present in the amount of about 3 wt. % to about 60 wt. % based on the total weight of the composition; the first polymeric component is present in the amount of about 10 wt. % to about 50 wt. % based on the total weight of the composition; the second polymeric component includes the S/LEP, wherein the ratio of the first polymeric component to the second polymeric component ranges from about 10:42 to about 10:2; the second polymeric component includes the propylene elastomer, wherein the ratio of the first polymeric component to the second polymeric component ranges from about 10:42 to about 10:2; the second polymeric component is present in the amount from about 10 wt. % to about 45 wt. % based on the total weight of the composition; the second polymeric component is present in the amount from about 10 wt. % to about 90 wt. % (e.g. about 20 wt. % to about 90 wt. %) based on the total weight of the composition; the second polymeric component is present in the amount from about 20 wt. % to about 45 wt. % (e.g., from about 20 wt. % to about 35 wt. %) based on the total weight of the composition; the soft thermoplastic includes an S/LEP having a density from about 0.850 to about 0.900 g/cm$^3$, and a melt index from about 0.2 to about 40 as measured according to ASTM D-1238-04 at 190° C., 2.16 kg; the soft thermoplastic includes an S/LEP having a density from about 0.860 to about 0.880 g/cm$^3$, and a melt index from about 0.5 to about 10 as measured according to ASTM D-1238-04 at 190° C., 2.16 kg; the S/LEP is present at a concentration from about 20 to about 35 wt. % based on the total weight of the polymeric composition; the S/LEP is characterized by a melt flow ratio $I_{10}/I_2$, $\geqq 5.63$, a molecular weight distribution, $M_w/M_n$, defined by the equation: $M_w/M_n \leqq I_{10}/I_2 - 4.63$, and a critical shear stress at onset of gross melt fracture of greater than about 4×10$^6$ dyne/cm$^2$; the S/LEP is characterized by one or any combination of the following: a density of 0.85-0.92 g/cm$^3$, an intrinsic viscosity [η] of 0.1-10 dl/g as measured in decalin at 135° C., a ($M_w/M_n$) ratio of a weight average molecular weight ($M_w$) to a number average molecular weight ($M_n$) of 1.2-4 as measured by GPC, or a (MFR10/MFR2) ratio of MFR10 under a load of 10 kg to MFR2 under a load of 2.16 kg of 8-50 as measured at 190° C. (MFR10 and MFR2 may be measured for example, using ASTM D-1238 at 190° C. with a load of 10 kg and 2.16 kg respectively); α-olefin comonomer of the S/LEP is a monomer having 8 carbon atoms (e.g., 1-octene); the ratio of the first polymeric component to the second polymeric component is from about 10:27 to about 10:2; the composition is characterized by (i) coefficient of friction (static) that ranges from about 0.2 to about 0.7 according to ASTM D-1894; (ii) coefficient of friction (dynamic) that ranges from about 0.1 to about 0.6 according to ASTM D-1894, or both (i) and (ii), for imparting a soft-touch feel to the composition; the first polymeric component includes an polypropylene homopolymer, a polypropylene random copolymer, a polypropylene impact copolymer, or any combination thereof; the first polymeric component has a melt flow rate from about 1 to about 60 g/10 min as measured according to ASTM D-1238 (at 230° C., 2.16 kg); the first polymeric component includes a polypropylene homopolymer present at a concentration from about 20 to about 50 wt. % based on the total weight of the polymeric composition; the composition includes a polypropylene homopolymer having a melt flow rate between about 50 to about 55 g/10 min according to ASTM D-1238 (at 230° C., 2.16 kg) and a CHARPY (notched) Impact Strength between about 1 and about 5 kJ/m$^2$ according to ISO 179-1/1 eA (at 23° C.), or both; the second polymeric component includes the S/LEP wherein the S/LEP is an ethylene-octene copolymer having from about 50 to about 70 wt. % ethylene based on the total weight of the ethylene-octene copolymer and the ethylene-octene copolymer has a melt flow rate from about 1 to about 30 g/10 min as measured according to ASTM D-1238 (at 190° C., 2.16 kg); the second polymeric component has a Shore A hardness of about 65 to about 95 according to ASTM D-2240; the polymeric composition has an overall ethylene concentration from about 2 to about 10 wt. % based on the total weight of the polymeric composition; the second polymeric component includes the propylene elastomer and the propylene elastomer is a propylene-ethylene copolymer having an ethylene concentration from about 4 to about 20 wt. % based on the total weight of the propylene elastomer; the second polymeric component includes the propylene elastomer and the propylene elastomer has a propylene concentration from about 80 wt. % to about 96 wt. % based on the total weight of the propylene elastomer; the propylene elastomer is a low elasticity ethylene-propylene copolymer (LEEP copolymer); the LEEP copolymer has one or any combination of the following characteristics: a melting point ranging from an upper limit of less than 110° C. to a lower limit of greater than 25° C., a relationship of elasticity to 500% tensile modulus such that Elasticity$\leqq 0.935M+12$ where elasticity is in percent and M is the 500% tensile modulus in megapascal (MPa), a relationship of flexural modulus to 500% tensile modulus such that Flexural Modulus$\leqq 4.2\ e^{0.27M}+50$ where flexural modulus is in MPa and M is the 500% tensile modulus in MPa, a heat of fusion ranging from a lower limit of greater than 1.0 joule to an upper limit of less than 125 J/g, a triad tacticity as determined by carbon-13 nuclear magnetic resonance ($^{13}$C NMR) of greater than 75%, a tacticity index m/r ranging from a lower limit of 4 an upper limit of 12, a proportion of inversely inserted propylene units based on 2.1 insertion of propylene monomer in all propylene insertions, as measured by $^{13}$C NMR, of greater than 0.5%, a proportion of inversely inserted propylene units based on 1.3 insertion of propylene monomer in all propylene insertions, as measured by $^{13}$C NMR, of greater than 0.05%, an intermolecular tacticity such that at least 75% by weight of the copolymer is soluble in two adjacent temperature fractions of a thermal fractionation carried out in hexane in 8° C. increments, a reactivity ratio product $r_1 r_2$ of less than 1.5, a molecular weight distribution Mw/Mn ranging from a lower limit of 1.5 to an upper limit of 40, a molecular weight of from 15,000-5,000,000, a solid state proton nuclear magnetic resonance ($^1$H NMR) relaxation time of less than 18 milliseconds (ms), an elasticity of less than 30%, or less than 20%, or less than 10%, or less than 8%, or less than 5%, or a 500% tensile modulus of greater than 0.5 MPa (or greater than 0.8 MPa, or greater than 1.0 MPa, or greater than 2.0 MPa); the propylene elastomer is a regio-error ethylene-propylene copolymer (R-EPE copolymer) wherein the R-EPE copolymer has one or any combination of the following characteristics: at least about 0.1 weight percent of units derived from ethylene, and having $^{13}$C NMR peaks corresponding to a regio-error at about 14.6 and about 15.7 ppm, the peaks of about equal intensity, at least about 60 weight percent of units derived from propylene and at least about 0.1 weight percent of units derived from ethylene, and having a skewness index, $S_{ix}$, greater than about −1.20, at least about 60 weight percent of units derived from propylene and at least about 0.1 weight percent of units derived from ethylene, and having a DSC curve with a $T_{me}$ that remains essentially the same and a $T_{max}$ that decreases as the amount of ethylene in the copolymer is increased, at least about 60 weight percent of units derived from propylene and at least about 0.1 weight percent of units derived from ethylene, and having an X-ray diffraction pattern exhibiting more gamma-form crystals than a propylene/ethylene copolymer comparable in weight average molecular weight except that it is prepared with a Ziegler-Natta catalyst, at least about 60 weight percent of units derived from propylene, or at least about 0.1 weight percent of units derived from ethylene, and having a B-value greater than about 1.4 when the ethylene content of the R-EPE copolymer is at least about 3 weight percent; the at least one reinforcement material includes glass fibers that are selected so that the glass fibers in the resulting composition have a mean fiber length of about 1 mm to about 2 mm; the at least one reinforcement material includes glass fibers present in a concentration from about 5 wt. % to about 40 wt. % (e.g., from about 10 wt. % to about 40 wt. %) based on the total weight of the polymeric composition; the polymeric composition is free of mineral filler; the polymeric composition is free of talc; or the polymeric composition is free of peroxide.

Another aspect of the invention is direct at a molded article including at least one part having a polymeric composition as described herein.

A processing aspect of the invention is directed at a process for manufacturing a molded article wherein a part of the molded article has a polymeric composition as described herein.

This aspect of the invention may be further described by one or any combination of the following features: the process comprises the steps of providing (e.g., feeding) from about 3 to about 60 parts by weight of a first material that includes at least a portion of the relatively hard thermoplastic, providing (e.g., feeding) from about 10 to about 70 parts by weight a second material that includes at least a portion of the relatively soft thermoplastic selected from the group consisting of the propylene elastomer, the substantially linear or linear ethylene polymer (S/LEP), or both, wherein the S/LEP comprises an α-olefin comonomer having from 4 through 20 carbon atoms and having an ethylene concentration from about 40 wt. % to about 85 wt. % based on the total weight of the S/LEP, and the propylene elastomer includes propylene and one or more α-olefin comonomers having 2, or 4 through 20 carbon atoms and has a comonomer concentration less than about 20 wt. % based on the total weight of the propylene elastomer, providing (e.g., feeding) about 20 to about 75 parts by weight a third material including a reinforcement concentrate having at least one reinforcement material, blending the first, second and third materials to form a blend, and shaping the blend in a tool to form an article; the article includes a material having one or both of a) a coefficient of friction (static) that ranges from about 0.2 to about 0.7 as measured according to ASTM D-1894 or a coefficient of friction (dynamic) that ranges from about 0.1 to about 0.6 as measured according to ASTM D-1894, or (b) an ethylene content of about 5 to about 9 parts by weight of the resulting article, or a combination of (a) and (b) for imparting a soft-touch feel to the composition; the at least one reinforcement material includes glass fibers, the at least one reinforcement concentrate further includes a polypropylene; the relatively hard thermoplastic is a polyethylene homopolymer a polyethylene copolymer, a polypropylene homopolymer, a polypropylene impact copolymer, a polypropylene random copolymer, or any combination thereof; the at least one reinforcement material includes long glass fibers having an average fiber length of greater than about 5 mm; the at least one reinforcement material includes short glass fibers having an average fiber length of less than 5 mm (preferably less than about 2 mm, or even less than about 0.5 mm); the polyolefin resin is present at a concentration from about 20 wt. % to about 60 wt. % based on the total weight of the reinforcement concentrate; the at least one reinforcement material is present in a concentration from about 30 wt. % to about 90 wt. % (e.g., from about 40 wt. % to about 80 wt. %) based on the total weight of the reinforcement concentrate; the at least one reinforcement material is present in the amount of about 10 wt. % to about 40 wt. % based on total weight of the molded article; the relatively soft thermoplastic includes the S/LEP present at a concentration from about 10 to about 45 wt. % based on the total weigh of molded article and the S/LEP has a density from about 0.850 to about 0.900 and a melt index from about 0.2 to about 40 as measured according to ASTM D-1238 (at 190° C., 2.16 kg); the relatively soft thermoplastic is the propylene elastomer having from about 4 to about 20 wt. % ethylene based on the total weight of the propylene elastomer, and has a melting temperature less than about 120° C.; the propylene elastomer has a Shore A hardness from about 65 to about 85 according to ASTM D-2240; the propylene elastomer has a crystallinity of less than about 30 wt. % (e.g., less than about 14 wt. %); the propylene elastomer has a crystallinity less than the crystallinity of the relatively hard thermoplastic; the molded article further comprises a coupling agent (e.g., a coupling agent which is present at a concentration of less than about 10 wt. % based on the total weight of the molded article); the process further comprises a step of compounding together two or more of the first material, the second, or the third material, prior to the blending step; the process is substantially free of compounding the any two of the first, second, and third materials prior to the blending step; the process comprises the steps of: providing a first material including a polypropylene homopolymer, a polypropylene impact copolymer, a polypropylene random copolymer, or any combination thereof, providing a second material comprising an S/LEP, a propylene elastomer, or both, providing at least one reinforcement material, admixing the first material, the second material, and the reinforcement material to a form a polymeric composition, and shaping the polymeric composition into a part; the polymeric composition is characterized by one or both of a coefficient of friction (static) that ranges from about 0.2 to about 0.7 as measured according to ASTM D-1894; a coefficient of friction (dynamic) that ranges from about 0.1 to about 0.6 as measured according to ASTM D-1894, for imparting a soft-touch feel to the composition; the shaping step includes a step of injection molding the polymer composition; the part is formed by a single shot molding; the admixing step comprises a step of admixing the reinforcement material and at least a portion of the first material, at least a portion of the second material or both prior to the step of providing the reinforcement material; the admixing step comprises a step of admixing the second material with at least a portion of the first material prior to the step of providing the at least one reinforcement material; the material of the part includes glass fibers having an average fiber length greater than about 1 mm (e.g., from about 1 mm to about 2 mm); the polymeric composition is free of mineral filler; the polymeric composition is free of talc; the polymeric composition is free of glass particles other than glass fibers; the polymeric composition is free of peroxide.

Another process aspect of the invention is directed at a process for manufacturing an article wherein the process comprises the steps of: providing a first material including a polypropylene homopolymer, a polypropylene impact copolymer, a polypropylene random copolymer, or any combination thereof, providing a second material comprising an S/LEP, a propylene elastomer, or both, providing at least one reinforcement material, admixing the first material, the second material, and the reinforcement material to a form a polymeric composition; pelletizing the polymeric composition to form pellets or granules capable of being fed into a thermoplastic molding machine; and placing at least 5 kg of the pellets or granules into a container.

This aspect of the invention may be further characterized by one or any combination of the following features: the process further comprises a step of injection molding the polymeric composition; the injection molding step includes a step of forming an article by a single shot injection molding; the admixing step comprises a step of admixing the reinforcement material and at least a portion of the first material, at least a portion of the second material or both prior to the step of providing the reinforcement material; or the admixing step comprises a step of admixing the second material with at least a portion of the first material prior to the step of providing the at least one reinforcement material.

Yet another aspect of the invention is directed at a soft-touch feel polymeric composition comprising a blend of: a first polymeric component; a second polymeric component, the second polymeric component including an ethylene content present in the amount of about 20 percent or less by weight of the second polymeric component; and at least one reinforcement material, wherein the ratio of the first polymeric component to the second polymeric component ranges from about 5:1 to about 1:4.2, the first polymeric component is present in the amount of about 3 to about 50 parts by weight of the composition, the second polymeric component includes a content of about 4 to about 20 percent by weight ethylene and is present in the amount of about 10 to about 70 parts by weight of the composition, and the second polymeric component has a Shore A hardness of about 65 to about 95 according to ASTM D-2240.

DETAILED DESCRIPTION OF THE INVENTION

In general, the present invention is directed to an improved polymeric composition, processes of forming the composition as well as articles or parts formed of the polymeric composition, by the processes, or both. Advantageously, the polymeric composition can be employed to form soft-touch feel parts or components with desirable characteristics at relatively low cost, and thus finds attractive application as parts for automotive applications (e.g., automotive interior components that are subject to passenger contact). The polymeric composition typically includes a first polymeric component that includes at least one relatively hard thermoplastic (e.g., a thermoplastic polymer including at least one polymer having greater than about 20% wt. % crystallinity, selected from a polypropylene homopolymer, a polyethylene homopolymer, a propylene copolymer, an ethylene copolymer, and any mixture thereof), a second polymeric component that includes at least one relatively soft thermoplastic (e.g., one or more elastomers such as a thermoplastic polyolefin), at least one reinforcement material (e.g., glass fibers), and optionally one or more additives that can include, without limitation, a coupling or cross-linking agent, a cross-linking coagent, a flame retardant, an ignition resistant additive, a stabilizer, a blowing agent, a blowing agent activator, a colorant, an antioxidant, a mold release agent, an anti-static agent, a slip-aid (i.e., slip resistance aid), a flow enhancer, a nucleating agent, a clarifying agent, or combinations thereof or others. In one aspect of the invention, the polymeric composition may be free of any coupling-agent, cross-linking agent, and blowing agent.

It has surprisingly been shown that reinforced compositions having a desirably low hardness and/or low flexural modulus may be obtained using a lower concentration of the relatively soft thermoplastic as compared with previously used soft thermoplastics. Additionally reinforced compositions of the present invention may have surprising improvements in their low temperature properties (e.g., ductility at temperatures of about −20° C.). It has unexpectedly been observed that reinforced compositions of the present invention may also have one or any combination of the following surface properties: improved gloss, improved scratch and/or mar resistance, a more rubbery soft-touch feel, high surface friction, or elimination/reduction of tiger striping. It is also observed that the compositions may also unexpectedly have desirable bulk properties, such as sound dampening properties, high stiffness, high heat distortion temperature and/or high Vicat softening temperature. These combinations of properties may allow for the reinforced compositions to be used to make a one shot molded article in applications which currently may require at least two materials (e.g., a first material for imparting good surface properties and a second material for imparting good bulk properties).

Additional teachings that may be applied in the practice of the present invention are disclosed in the concurrently filed U.S. application Ser. No. 12/256,301 filed on Oct. 22, 2008, herein incorporated by reference in its entirety.

First Polymeric Component/Hard Thermoplastic

Turning now in greater detail to the individual components of the overall composition. The articles herein will typically include a first polymeric component that includes at least one hard thermoplastic (which may be a thermoplastic polymer) that is relatively strong, rigid, impact resistant, or any combination thereof. For instance, the thermoplastic polymer herein may be polyolefinic, and more preferably may be a polyolefinic homopolymer. The first polymeric component will typically be present in an amount of at least about 3 wt. %, preferably at least about 10 wt. %, more preferably at least about 15 wt. %, most preferably at least about 20 wt. % (e.g., at least about 30 wt. %) based on the total weight of the polymeric composition. The overall polymeric composition also typically includes less than about 70 wt. %, more typically less than about 60 wt. %, more typically less than about 45 wt % and most typically less than about 40 wt. % of the first polymeric component.

Preferably, the thermoplastic polymer includes at least one polymer selected from a polypropylene homopolymer, a polyethylene homopolymer, a propylene copolymer, an ethylene copolymer, and any mixture thereof. Without limitation, one specific example of a preferred polypropylene homopolymer is disclosed in U.S. Pat. No. 7,087,680, incorporated by reference for all purposes.

The polypropylene is generally in the isotactic form of homopolymer polypropylene, although other forms of homopolymer polypropylene may also be used such as syndiotactic polypropylene or atactic polypropylene at low concentrations (e.g. less than about 15 wt %, or even less than about 5 wt % based on the total weight of the homopolymer polypropylene). The polypropylene may also be a polypropylene impact copolymers (e.g., those wherein a secondary copolymerization step reacting ethylene with the propylene is employed) or a polypropylene random copolymers (also reactor modified and typically containing 2-20 wt. % and more typically containing 2-7 wt. % ethylene copolymerized with the propylene).

The molecular weight and hence the melt flow rate of the hard thermoplastic (e.g. the polypropylene) for use in the present invention may vary depending upon the application. The melt flow rate for the soft thermoplastic, such as the polypropylene, useful herein may be greater than about 0.1 g/10 min, preferably greater than about 0.5 g/10 min, more preferably greater than about 3 g/10 min, and most preferably greater than about 5 g/10 min as measured according to ISO 1133 tested at 230° C./2.16 kg. The melt flow rate for the soft thermoplastic, such as the polypropylene, useful herein may be less than about 100 g/10 min, preferably less than about 80 g/10 min, more preferably less than about 60 g/10 min, and most preferably less than about 30 g/10 min as measured according to ISO 1133 tested at 230° C./2.16 kg. As such, the melt flow rate may be from about 0.1 grams/10 minutes (g/10 min) to about 100 g/10 min, preferably from about 0.5 g/10 min to about 80 g/10 min, more preferably from about 3 to about 60 g/10 min, and most preferably from about 5 g/10 min to about 60 g/10 (e.g., from about 30 g/10 min to about 60 g/10 min) measured according to ISO 1133 tested at 230° C. with a load of 2.16 kg.

As indicated, it is likely that the first polymeric component will be important for helping to impart rigidity, strength, and possibly even impact resistance to the overall resulting composition. Accordingly, the material selected desirably will exhibit attractive impact resistance. For example, the CHARPY (notched) impact strength (at 23° C.) for the soft thermoplastics (e.g. the polypropylene) useful herein may be greater than about 0.8 kJ/m$^2$, preferably greater than about 1 kJ/m$^2$, more preferably greater than about 1.6 kJ/m$^2$, and most preferably greater than about 2 kJ/m$^2$ (e.g. greater than about 2.3 kJ/m$^2$, or even greater than about 4 kJ/m$^2$) as measured according to ISO 179-1/1 eA. Suitable soft thermoplastics (e.g. suitable polypropylenes) may be also be characterized by a CHARPY (notched) impact strength (at 23° C.) for the polypropylene less than about 15 kJ/m$^2$, preferably less than about 12 kJ/m$^2$, more preferably less than about 8 kJ/m$^2$, and most preferably less than about 6 kJ/m$^2$ (e.g. less than about 5 kJ/m$^2$) as measured according to ISO 179-1/1 eA at 23° C.

In one preferred aspect of the invention, the thermoplastic polymer includes a polypropylene homopolymer having a melt flow rate from about 1 to about 5 g/10 min as measured according to ISO 1133 (at 230° C., 2.16 kg) and a CHARPY (notched) Impact Strength from about 3 to about 8 kJ/m$^2$ as measured according to ISO 179-1/1 eA (at 23° C.). In a second preferred aspect of the invention the thermoplastic polymer includes a polypropylene homopolymer having a melt flow rate from about 40 to about 60 g/10 min (e.g., from about 50 to about 55 g/10 min) as measured according to ISO 1133 (at 230° C., 2.16 kg) and a CHARPY (notched) Impact Strength from about 1 to about 5 kJ/m$^2$ as measured according to ISO 179-1/1 eA (at 23° C.). In a third preferred aspect of the invention the thermoplastic polymer includes a polypropylene impact copolymer having a melt flow rate from about 30 to about 55 g/10 min (e.g., from about 37 to about 47 g/10 min) as measured according to ISO 1133 (at 230° C., 2.16 kg) and a CHARPY (notched) Impact Strength from about 4 to about 12 kJ/m$^2$ (e.g., from about to about 8 kJ/m$^2$) as measured according to ISO 179-1/1 eA (at 23° C.).

It is appreciated that the first polymeric component (e.g., the thermoplastic polymer) useful herein may exhibit a Flexural Modulus as measured according to ISO 178 that typically ranges from about 1400 to about 1800 MPa, and more specifically from about 1500 to about 1700 MPA; a Tensile Strength at Yield according to ISO 527-2 that typically ranges from about to about 50 MPa, and more specifically from about 30 to about 40 MPa; a Tensile Elongation at Yield according to ISO 527-2 that ranges from about 5 to about 20%, more specifically from about 7 to about 15%, or any combination thereof. In one highly preferred embodiment, the first polymeric component includes a propylene polymer, preferably a polypropylene homopolymer, and most preferably an isotactic polypropylene (e.g., an isotactic polypropylene which contains less than about 5 wt % atactic polypropylene). Although, it may nonetheless include a random copolymer or even an impact copolymer (which already contains a rubber phase). Examples of particularly preferred polypropylene homopolymers for use herein include one or both H705-03 or H734-52, available from The Dow Chemical Company or others having similar characteristics. Examples of particularly preferred polypropylene impact copolymers for use herein include C705-44NA, available from The Dow Chemical Company or others having similar characteristics.

Second Polymeric Component/Soft Thermoplastic

The second polymeric component is characterized in being softer (e.g., low Shore A durometer), more flexible (e.g., lower flexural modulus), lower crystallinity than the hard first polymeric component, or any combination thereof. The second polymeric component typically includes one or more (relatively) soft thermoplastics. Suitable soft thermoplastics include an olefinic block copolymer (e.g., a lower-α-olefin/α-olefin interpolymer such as an ethylene/α-olefin interpolymer or an ethylene/α-olefin interpolymer), a substantially linear or linear ethylene polymer ("S/LEP"), a propylene elastomer, or any combination thereof. In one aspect of the invention, the second polymer component includes or consists essentially of an ethylene/α-olefin interpolymer. In another aspect of the invention, the second polymer component includes or consists essentially of an S/LEP. In still another aspect of the invention, the second polymer component includes or consists essentially of a propylene elastomer. In yet another aspect of the invention, the soft thermoplastic includes two or all three of the above mentioned soft polymers.

As indicated, the composition of the present invention further contemplates a second polymeric component which may include an ethylene content, and preferably includes at least one ethylene containing soft thermoplastic (e.g. an ethylene containing elastomer which is semi-crystalline). The second polymeric component thus may comprise one or more soft thermoplastics that typically include one or any combination of copolymers including ethylene, and at least a portion of the soft thermoplastic has a phase transition (e.g., a peak melting temperature, or a glass transition temperature, but preferably a peak melting temperature) at a temperature greater than about 40° C. (e.g. at least a portion of the elastomer is crystalline).

The second polymer component, the soft thermoplastic, or both may have a crystallinity greater than about 2%, preferably greater than about 3%, more preferably greater than about 5%, and most preferably greater than about 7% (e.g., greater than about 10%) by weight. The second polymer component, the soft thermoplastic, or both may have a crystallinity less than about 44%, preferably less than about 40%, more preferably less than about 35% and most preferably less than about 30% (e.g., less than about 20%) by weight. For example, the second polymer component, the soft thermoplastic, or both may have a crystallinity from about 2% to about 44%, preferably from about 2% to about 40%, more preferably from about 5% to about 35% and most preferably from about 7% to about 30% (e.g., from about 10% to about 20%) by weight.

The second polymeric component, the soft thermoplastic or both may be present in the amount of at least about 10 wt. %, preferably at least about 20 wt. %, and more preferably at least about 25 wt. %, and most preferably at least about 30 wt. % based on the total weight of the overall polymeric composition. The second polymeric component, the soft thermoplastic, or both may be present in the amount of less than about 90 wt. %, preferably less than about 75 wt. % and more preferably less than about 70 wt. %, and most preferably less than about 50 wt. % based on the total weight of the overall polymeric composition.

SLEPs

The second polymeric component herein may employ one or more α-olefin soft thermoplastics (e.g. α-olefin elastomers), such as one or more linear ethylene copolymers (also known as "LEPs"), one or more substantially linear ethylene copolymers (also known as "SLEPs"), or both. As used herein, "S/LEPs" typically include LEPs and/or SEPs. Substantially linear ethylene copolymers and linear ethylene copolymers and their method of preparation are fully described in U.S. Pat. Nos. 5,272,236; and 5,278,272, which are fully incorporated herein by reference for all purposes.

As used herein, "a linear or substantially linear ethylene polymer" means a copolymer of ethylene and one or more α-olefin comonomers having a linear backbone, a specific and limited amount of long-chain branching or no long-chain branching, a narrow molecular weight distribution, a narrow composition distribution (e.g., for α-olefin copolymers) or a combination thereof. More explanation of such polymers is discussed in U.S. Pat. No. 6,403,692, which is incorporated herein by reference for all purposes.

Illustrative α-olefins include propylene, 1-butene, 1-hexene, 4-methyl-1-pentene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, ethyleneoctene, vinylcyclopentene, vinylcyclohexene and vinylinorbornene, where alkyl branching position is not specified it is generally on position 3 or higher of the alkene and styrene. The α-olefin is desirably a $C_3$-$C_{20}$ or $C_3$-$C_{10}$ α-olefin. Preferred copolymers include ethylene-propylene (EP), ethylene-butene (EB), ethylene-hexene-1 (EH), and ethylene-oxide (EO) polymers. Illustrative terpolymers include an ethylene/propylene/octene terpolymer as well as terpolymers of ethylene, a $C_3$-$C_{20}$ α-olefin and a diene such as dicyclopentadiene, 1,4-hexadiene, piperylene or 5-ethylidene-2-norbornene.

The S/LEP may include one or more higher α-olefin containing at least 4 carbon atoms (e.g., at least 8 carbon atoms). For example, suitable higher α-olefins may include one or more α-olefins containing from 4 through about 20 carbon atoms (e.g., from 8 to through about 20 carbon atoms), more preferably one or more α-olefins containing from about 8 to about 12 carbon atoms. Without limitation, the higher α-olefin may be butane, hexane, octane, or any combination thereof. The higher α-olefin may include or consist essentially of 1-octene. Without limitation, exemplary S/LEPs (e.g., S/LEPs which may be useful as the ethylene elastomers) may contain greater than about 50 wt. %, and preferably greater than about 55 wt. % ethylene monomer based on the total weight of the S/LEP. Exemplary S/LEPs may contain less than about 85 wt. %, preferably less than about 80% and more preferably, less than about 70 wt. % ethylene monomer based on the total weight of the S/LEP. The concentration of the higher α-olefin in the S/LEP may be greater than about 12 wt. %, more preferably greater than 20 wt. %, and most preferably greater than about 30 wt. % based on the total weight of the S/LEP. For example, the S/LEP may be a copolymer which contains ethylene monomer at a concentration greater than about 50 wt. % and 1-octene monomer at a concentration greater than about 12 wt. % (e.g. greater than about 20 wt. %) based on the total weight of the S/LEP. Suitable S/LEPs are commercially available from THE DOW CHEMICAL COMPANY under the designation of Engage®.

Without limitation, an exemplary S/LEP, as described in U.S. Pat. No. 5,272,236 (e.g., column 2, lines 41-51 and column 3, lines 25-30) may be characterized as substantially linear olefin polymers having the following novel properties:

a) a melt flow rate ratio, $I_{10}/I_2$, $\geq 5.63$, b) a molecular weight distribution, $M_w/M_n$, defined by the equation:

$$M_w/M_n \leq I_{10}/I_2 - 4.63, \text{ and}$$

c) a critical shear stress at onset of gross melt fracture of greater than about $4\times10^6$ dyne/cm².

Such a polymer, may be an interpolymer of ethylene with at least one $C_3$-$C_{20}$ α-olefin. The melt flow ratio, $I_{10}/I_2$, is the ratio of "$I_{10}$" (the melt flow index measured in accordance with ASTM D-1238 (190/10)) and "12" (the melt flow index measured in accordance with ASTM D-1238 (190/2.16). These "substantially linear" polymers may have a polymer backbone that is either unsubstituted or substituted with up to 3 long chain branches/1000 carbons (where a long chain branch contains at least about 6 carbons). Preferred polymers are substituted with about 0.01 long chain branches/1000 carbons to about 3 long chain branches/1000 carbons, more preferably from about 0.01 long chain branches/1000 carbons to about 1 long chain branches/1000 carbons, and especially from about 0.3 long chain branches/1000 carbons to about 1 long chain branches/1000 carbons. The measurement of the polydispersity index of this polymer, as described in U.S. Pat. No. 5,272,236 column 5, lines 18-40, is done according to the following technique: The polymers are analyzed by gel permeation chromatography (GPC) on a Waters 150 C high temperature chromatographic unit equipped with three linear mixed bed columns (Polymer Laboratories (10 micron particle size)), operating at a system temperature of 140° C. The solvent is 1,2,4-trichlorobenzene, from which about 0.5% by weight solutions of the samples are prepared for injection. The flow rate is 1.0 milliliter/minute and the injection size is 100 microliters. The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the equation:

$$M_{polyethylene} = (a)(M_{polystyrene})^b$$

In this equation, a=0.4316 and b=1.0. Weight average molecular weight, $M_w$, is calculated in the usual manner according to the formula:

$$M_w = (R)(w_i)(M_i)$$

where $w_i$ and $M_i$ are the weight fraction and molecular weight respectively of the ith fraction eluting from the GPC column. The critical shear stress at onset of gross melt fracture. The critical shear stress at onset of gross melt fracture is measured by a gas extrusion rheometer (GER) as described in U.S. Pat. No. 5,272,236 (e.g., column 4, lines 10-45). The gas extrusion rheometer is described by M. Shida, R. N. Shroff and L. V. Cancio in Polymer Engineering Science, Vol. 17, no. 11, p. 770 (1977), and in "Rheometers for Molten Plastics" by John Dealy, published by Van Nostrand Reinhold Co. (1982) on page 97, both publications of which are incorporated by reference herein in their entirety. All GER experiments are performed at a temperature of 190° C., at nitrogen pressures between 5250 to 500 psig using a 0.0296 inch diameter, 20:1 L/D die. An apparent shear stress vs. apparent shear rate plot is used to identify the melt fracture phenomena. According to Ramamurthy in Journal of Rheology, 30(2), 337-357, 1986, above a certain critical flow rate, the observed extrudate irregularities may be broadly classified into two main types: surface melt fracture and gross melt fracture. Surface melt fracture occurs under apparently steady flow conditions and ranges in detail from loss of specular gloss to the more severe form of "sharkskin". Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER. Preferably, the critical shear stress at the OGMF and the critical shear stress at the OSMF for the substantially linear ethylene polymers described herein is greater than about $4\times10^6$ dyne/cm$^2$ and greater than about $2.8\times10^6$ dyne/cm$^2$, respectively.

Without limitation, another example of a suitable S/LEP is described in EP Patent No. 0495099, filed Dec. 12, 1989, incorporated by reference herein. EP Patent No. 0495099 describes S/LEP copolymers having (a) structural units derived from ethylene and (b) structural units derived from α-olefin of 3-20 carbon atoms, which are characterized in that they have
(i) a density of 0.85-0.92 g/cm$^3$,
(ii) an intrinsic viscosity [η] of 0.1-10 dl/g as measured in decalin at 135° C.,
(iii) a ($M_w/M_n$) ratio of a weight average molecular weight ($M_w$) to a number average molecular weight ($M_n$) of 1.2-4 as measured by GPC, and
(iv) a (MFR10/MFR2) ratio of MFR10 under a load of 10 kg to MFR2 under a load of 2.16 kg of 8-50 as measured at 190° C. MFR10 and MFR2 may be measured for example, using ASTM D-1238 at 190° C. with a load of 10 kg and 2.16 kg respectively.

The S/LEP may be polymerized using any suitable catalyst system. For example, the elastomer may be polymerized using a catalyst containing a Ziegler-Natta catalyst, a metallocene catalyst, an activated nonmetallocene metal-centered heteroaryl ligand catalyst, and the like. Combinations of catalysts may also be used. Without limitation, one exemplary catalyst is a metallocene catalyst. For example, the S/LEP may be polymerized using a catalyst which includes a metallocene catalyst as described in EP Patent Application No. 129368, filed on Jun. 5, 1984 (Ewen et. al.) incorporated herein by reference. Such metallocene may be a compound of the general formula:

wherein Me is a Group 4b, 5b, 6b metal, ($C_5R'_m$) is a cyclopentadienyl or substituted cylcopentadienyl, each R', which can be the same or different, is hydrogen, an alkyl, an alkenyl, aryl, alkylaryl, or arylalkyl radical having from 1 to 20 carbon atoms or two R' substituents together form a fused $C_4$-$C_6$ ring, R" is a $C_1$-$C_4$ alkylene radical, a dialkyl germanium or silicone, or an alkyl phosphine or amine radical bridging two ($C_5$—$R'_m$) rings, each Q, which can be the same or different, is aryl, alkyl, alkenyl, alkylaryl, or arylalkyl radical having from 1 to 20 carbon atoms or halogen, Q' is an alkylidene radical having from 1 to 20 carbon atoms, s is 0 or 1, p is 0, 1 or 2; when p is 0, s is 0; m is 4 when s=1; and m is 5 when s is 0 and at least one R' is a hydrocarbyl radical when Q is an alkyl radical.

The S/LEP may have a phase transition (e.g., a peak melting temperature) at a temperature greater than about 40° C. (e.g. at least a portion of the S/LEP is crystalline). The S/LEP may have a crystallinity from about 2% to about 14%, more preferably from about 3% to about 11% and most preferably from about 4% to about 9%.

The S/LEP will typically be present in the amount of at least about 10 wt. %, more typically at least about 20 wt. %, and still more typically at least about 25 wt. % (e.g., at least about 30 wt. %) based on the total weight of the overall polymeric composition. The second polymeric component also typically includes less than about 80 wt. %, more typically less than about 75 wt. %, most typically less than about 70 wt. %, and possibly less than about 45 wt. % (e.g., less than about 35 wt. %) based on the total weight of the overall polymeric composition.

The S/LEP selected for the second polymeric component may exhibit a Shore A hardness according to ASTM D 2240-05 of at least about 25, preferably at least about 45, more preferably at least about 55, and still more preferably at least about 60, and most preferably at least about 65. The Shore A hardness of the S/LEP may be less than about 95, preferably less than about 90, more preferably less than about 85, and still more preferably less than about 80. For example, the hardness of the S/LEP may range from about 65 to about 95, more preferably from about 65 to about 85, and still more preferably from about 65 to about 80.

S/LEPs for use in the second polymeric component generally have a density of between about 0.8 to about 0.9 g/cm$^3$ (e.g., from about 0.855 to about 0.895 g/cm$^3$) as measured according to ASTM D 792-00. Suitable S/LEPs may have a density of at least 0.850, preferably at least 0.855, more preferably at least 0.860, most preferably at least 0.867 g/cm$^3$. The density of the ethylene elastomer may be less than about 0.908, preferably less than about 0.900, more preferably less than about 0.890, and most preferably less than about 0.880 g/cm$^3$. Densities are determined as measured by ASTM D 792-00.

Suitable S/LEPs may be characterized by a melt index as measured according to ASTM D-1238-04 (at 190° C., 2.16 kg) of at least about 0.2, preferably at least about 0.5, more preferably at least about 1.0, and still more preferably at least about 5 g/10 min. The melt index also may be below about 60, preferably below about 40, and more preferably below about 30, and most preferably below about 10 g/10 min. For example, the melt flow rate may range from about 0.2 to about 60, more preferably from about 2 to about 40, and still more preferably about 0.5 to about 10 g/10 min.

Propylene Elastomer

The second polymeric component may also include or consist essentially of a polypropylene elastomer. Suitable polypropylene elastomers may contain propylene monomer at a concentration greater than about 50 wt. %, preferably greater than about 65 wt. %, more preferably greater than about 70 wt. %, and most preferably greater than about 80 wt. % (e.g., at least 85 wt. %) based on the weight of the polypropylene elastomer. The polypropylene elastomer may also contain one or more additional $C_{2-12}$ α-olefin comonomers (e.g., a comonomer including ethylene, or consisting of ethylene, or including butene, or consisting of butene) at a concentration greater than about 5 wt. %, preferably greater than about 7 wt. %, more preferably greater than about 9 wt. %, and most preferably greater than about 12 wt. % based on the total weight of the polypropylene elastomer. For example, the comonomer content may range from about 5 to about 40 percent by weight of the polypropylene elastomer composition, more preferably from about 7 to about 30 percent by weight of the polypropylene elastomer composition, and still more preferably from about 9 to about 15 percent by weight of the polypropylene elastomer composition. The polypropylene elastomer may have some crystallinity or may be amorphous. Suitable polypropylene elastomers may have a peak melting temperature less than about 130° C., preferably less than about 115° C., and most preferably less than about 100° C., as measured by differential scanning calorimetry at a heating rate of about 10° C./min on a sample which has been cooled from about 220° C. to about 0° C. at a rate of about 10° C./min.

The propylene elastomer preferably contains an α-olefin selected from ethylene, butene, hexene, and octene. More preferably the propylene elastomer contains an α-olefin selected from ethylene, butene, and octene. Most preferably the propylene elastomer contains an α-olefin selected from ethylene and butene.

The polypropylene elastomer may exhibit a Shore A hardness (i.e., durometer) as measured according to ASTM D 2240-05 of at least about 40, more preferably at least about 50, still more preferably at least about 65. The Shore A hardness may also be less than about 97, preferably less than about 95, more preferably less than about 92, still more preferably less than about 85 (e.g., less than about 80). For example, the polypropylene elastomer may have a Shore A hardness from about 40 to about 97, more preferably from about 50 to about 95, and still more preferably from about 65 to about 95 Shore A.

Suitable polypropylene elastomer may have a melt flow rate as measured according to ASTM D1238 at 230° C./2.16 kg of at least 1, preferably at least about 4, more preferably at least about 7, and most preferably at least about 10 g/10 min. Without limitation, the propylene elastomers suitable for the polymeric composition may have a melt flow rate of less than about 1500, preferably less than about 150, more preferably less than about 100, and most preferably less than about 60 g/10 min.

It is preferred that the polypropylene elastomer exhibit at least some crystallinity. For example, the crystallinity may be at least about 2, preferably at least about 5, and still more preferably at least about 7 percent by weight of the polypropylene elastomer material. Without limitation, suitable polypropylene elastomers may have a crystallinity less than about 50 wt. %. For example, the crystallinity of the propylene elastomer may be less about 40, preferably less than about 35, more preferably less than about 28, and still more preferably less than about 20 percent by weight of the polypropylene elastomer material. In general, suitable propylene elastomer may have a crystallinity from about 2 wt. % to about 50 wt. %. For example, the crystallinity may range from about 2 to about 40, more preferably from about 5 to about 35, and still more preferably about 7 to about 20 percent by weight of the polypropylene elastomer material.

If the propylene elastomer is a copolymer of propylene and ethylene (i.e, the comonomer is ethylene) then it will be appreciated from the above that the resulting preferred overall compositions (i.e., the polymeric composition) which include a propylene elastomer will therefore have an ethylene content (i.e. a total ethylene content). For example, in one aspect the overall ethylene content in the final resulting composition may be greater than about 2 percent by weight of the overall resulting composition, preferably greater than about 3 percent by weight of the overall resulting composition, and more preferably greater than about 4 percent by weight of the overall resulting composition. In this aspect of the invention, It is generally expected however that the total concentration of ethylene in the overall resulting composition will be less than about 35 percent by weight of the overall composition, preferably less than about 25 percent by weight of the overall composition, more preferably less than about 20 percent by weight of the overall composition, and still more preferably less than about 10 percent by weight of the overall resulting composition.

If the propylene elastomer is a copolymer of propylene and a $C_4$-$C_{12}$ α-olefin (e.g., butene, hexane, or octene), then it will be appreciated from the above that the resulting preferred overall compositions (i.e., the polymeric composition) which include a propylene elastomer will therefore have a total $C_4$-$C_{12}$ α-olefin. For example, in one aspect the overall $C_4$-$C_{12}$ α-olefin content in the final resulting composition may be greater than about 2 percent by weight of the overall resulting composition, preferably greater than about 3 percent by weight of the overall resulting composition, and more preferably greater than about 4 percent by weight of the overall resulting composition. In this aspect of the invention, It is generally expected however that the total concentration of $C_4$-$C_{12}$ α-olefin in the overall resulting composition will be less than about 35 percent by weight of the overall composition, preferably less than about 25 percent by weight of the overall composition, more preferably less than about 20 percent by weight of the overall composition, and still more preferably less than about 10 percent by weight of the overall resulting composition.

Without limitation, suitable propylene elastomers that may be employed in accordance with the present teachings include those disclosed in International Patent Application Publication No. WO 03/040201 A1 filed on May 6, 2002, published US Patent Application No. 2003/0204017 filed on May 5, 2002, and U.S. Pat. No. 6,525,157 issued on Feb. 25, 2003, all of which are incorporated by reference.

For example, the propylene elastomer may be a low elasticity α-olefin-propylene copolymer, such as a low elasticity ethylene-propylene copolymer (i.e., an LEEP copolymers) taught in U.S. Pat. No. 6,525,157 issued on Feb. 25, 2003, incorporated herein by reference. Such an LEEP, as described in U.S. Pat. No. 6,525,157 issued on Feb. 25, 2003 from column 2, line 15 to column 3, line 54 may be (LEEP) copolymers that when produced in the presence of a metallocene catalyst and an activator, in a single steady state reactor, show a surprising and unexpected balance of flexural modulus, tensile strength and elasticity. Moreover, these and other properties of the (LEEP) copolymers show surprising differences relative to conventional polymer blends, such as blends of isotactic polypropylene and ethylene-propylene copolymers.

In one embodiment, the (LEEP) copolymer includes from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The copolymer is substantially free of diene-derived units.

In various embodiments, features of the (LEEP) copolymers include some or all of the following characteristics, where ranges from any recited upper limit to any recited lower limit are contemplated:

(i) a melting point ranging from an upper limit of less than 1100° C., or less than 900° C., or less than 80° C., or less than 70° C., to a lower limit of greater than 25° C., or greater than 35° C., or greater than 40° C., or greater than 45° C.;

(ii) a relationship of elasticity to 500% tensile modulus such that Elasticity≦0.935M+12, or Elasticity≦0.935M+6, or Elasticity≦0.935M, where elasticity is in percent and M is the 500% tensile modulus in mega Pascal (MPa);

(iii) a relationship of flexural modulus to 500% tensile modulus such that Flexural Modulus≦4.2 $e^{0.27M}$+50, or Flexural Modulus≦4.2 $e^{0.27M}$+30, or Flexural Modulus≦4.2 $e^{0.27M}$+10, or Flexural Modulus≦4.2 $e^{0.27M}$+2, where flexural modulus is in MPa and M is the 500% tensile modulus in MPa;

(iv) a heat of fusion ranging from a lower limit of greater than 1.0 joule per gram (J/g), or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g;

(v) a triad tacticity as determined by carbon-13 nuclear magnetic resonance ($^{13}$C NMR) of greater than 75%, or greater than 80%, or greater than 85%, or greater than 90%;

(vi) a tacticity index m/r ranging from a lower limit of 4 or 6 to an upper limit of 8 or 10 or 12;

(vii) a proportion of inversely inserted propylene units based on 2.1 insertion of propylene monomer in all propylene insertions, as measured by $^{13}$C NMR, of greater than 0.5% or greater than 0.6%;

(viii) a proportion of inversely inserted propylene units based on 1.3 insertion of propylene monomer in all propylene insertions, as measured by $^{13}$C NMR, of greater than 0.05%, or greater than 0.06%, or greater than 0.07%, or greater than 0.08%, or greater than 0.085%;

(ix) an intermolecular tacticity such that at least X % by weight of the copolymer is soluble in two adjacent temperature fractions of a thermal fractionation carried out in hexane in 8° C. increments, where X is 75, or 80, or 85, or 90, or 95, or 97, or 99;

(x) a reactivity ratio product $r_1 r_2$ of less than 1.5, or less than 1.3, or less than 1.0, or less than 0.8;

(xi) a molecular weight distribution Mw/Mn ranging from a lower limit of 1.5 or 1.8 to an upper limit of 40 or 20 or 10 or 5 or 3;

(xii) a molecular weight of from 15,000-5,000,000;

(xiii) a solid state proton nuclear magnetic resonance ($^1$H NMR) relaxation time of less than 18 milliseconds (ms), or less than 16 ms, or less than 14 ms, or less than 12 ms, or less than 10 ms;

(xiv) an elasticity as defined herein of less than 30%, or less than 20%, or less than 10%, or less than 8%, or less than 5%; and (xv) a 500% tensile modulus of greater than 0.5 MPa, or greater than 0.8 MPa, or greater than 1.0 MPa, or greater than 2.0 MPa.

The LEEP copolymer be made in the presence of a bridged metallocene catalyst, in a single steady-state reactor.

The test methods for the LEEP copolymer are described in U.S. Pat. No. 6,525,157.

The test method for the measurement of the melting temperature and the heat of fusion of the LEEP copolymer is described in U.S. Pat. No. 6,525,157 from column 19, line 12 to column 19, line 29: The melting point and heat of fusion are measured by Differential Scanning Calorimetry (DSC) follows. About 6 to 10 mg of a sheet of the polymer pressed at approximately 200° C. to 230° C. is removed with a punch die. This is annealed at room temperature for 24 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output is recorded as the area under the melting peak of the sample, which is typically peaked at about 30° C. to about 175° C. and occurs between the temperatures of about 0° C. and about 200° C., and is measured in joules as a measure of the heat of fusion. The melting point is recorded as the temperature of the greatest heat absorption within the range of melting of the sample.

The test methods for the measuring the elasticity, the 500% elastic modulus and the flexural modulus of the LEEP copolymer are described in U.S. Pat. No. 6,525,157 from column 17, line 1 to column 18, line 60:

Embodiments of the LEEP copolymer are elastic after tensile deformation. The elasticity, represented by the fractional increase in the length of the sample, represented as percent of the length of the sample, is measured according to the general procedure ASTM D790. During tensile elongation, the copolymer sample is stretched, and the polymer attempts to recover its original dimensions when the stretching force is removed. This recovery is not complete, and the final length of the relaxed sample is slightly longer than that of the original sample. Elasticity is represented by the fractional increase in the length of the sample, expressed as a percent of the length of the original un-stretched sample.

The protocol for measuring the elasticity of the sample consists of prestretching the deformable zone of the dumbbell, made according to the procedure described above for the measurement of elongation and tensile strength, which is the narrow portion of the specimen, to 200% of its original length to prestretch the sample. This is conducted at a deformation rate of 10 inches (25 cm) per minute. The sample is relaxed at the same rate to form an analytical specimen which is a prestretched specimen of the original sample. This slightly oriented, or prestretched, sample is allowed to relax for 48 hours, at room temperature, prior to the determination of elasticity. The length of the deformation zone in the sample is measured to be $d_1$. After the 48 hours, it is again deformed at 10 inches per minute for a 200% extension of the deformation zone of the sample and allowed to relax at the same rate. The sample is removed and after 10 minutes of relaxation the sample is measured to have a new length of the deformation zone of $d_2$. The elasticity of the sample as a percent is determined as $100*(d_2-d_1)/d_1$.

Embodiments of the LEEP copolymer may have elasticity, as measured by the procedure described above, of less than 30%, or less than 20%, or less than 10%, or less than 8% or less than 5%.

These values of the elasticity over the range of composition of the copolymer vary with the tensile strength of the sample as measured by the 500% tensile modulus. Elasticity of this family of copolymers is thus represented by two criteria: (a) extensibility to 500% elongation with a measurable modulus (500% tensile modulus) and (b) elasticity from an extension to 200% elongation on a slightly oriented sample as described above. First, the copolymer of embodiments of the LEEP copolymer should have a measurable tensile strength at 500% elongation (also known as 500% tensile modulus), of greater than 0.5 MPa, or greater than 0.75 MPa, or greater than 1.0 MPa, or greater than 2.0 MPa; and second, the copolymer should have the above-described elasticity.

Alternatively, the relationship of elasticity to 500% tensile modulus may be described. In embodiments of the LEEP copolymer, the elasticity as a function of 500% tensile modulus in MPa is defined by:

Elasticity (%)≦0.935 M+12;

or

Elasticity (%)≦0.935 M+6;

or

Elasticity (%)≦0.935 M where M is the 500% tensile modulus in MPa.

Flexural Modulus

Softness of the copolymers of embodiments of the LEEP copolymer may be measured by flexural modulus. Flexural modulus is measured in accordance with ASTM D790, using a Type IV dogbone at crosshead speed of 0.05 in/min (1.3 mm/min). The values of the flexural modulus over the range of composition of the copolymer vary with the tensile strength of the sample as measured by the 500% tensile modulus. Flexural modulus of this family of copolymers is thus represented by two criteria: (a) extensibility to 500% elongation with a measurable modulus (500% tensile modulus); and (b) flexural modulus. The flexural modulus of the LEEP copolymer in MPa as a function of 500% tensile modulus in MPa, is defined by:

$$\text{Flexural Modulus} \leq 4.2\, e^{0.27M} + 50;$$

or $$\text{Flexural Modulus} \leq 4.2\, e^{0.27M} + 30;$$

or $$\text{Flexural Modulus} \leq 4.2\, e^{0.27M} + 10;$$

or $$\text{Flexural Modulus} \leq 4.2\, e^{0.27M} + 2.$$

The test method for measuring the tacticity index of the LEEP copolymer is described in U.S. Pat. No. 6,525,157 from column 6, line 22 to 36: The tacticity index, expressed herein as "m/r", is determined by $^{13}$C nuclear magnetic resonance (NMR). The tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. LEEP copolymers can have a tacticity index m/r ranging from a lower limit of 4 or 6 to an upper limit of 8 or 10 or 12.

The test method for measuring the molecular weight and polydispersity index of the LEEP copolymer as described in U.S. Pat. No. 6,525,157 from column 5, line 1 to 57 includes the following:

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \left[\sum_i N_i M_i^{n+1}\right] \bigg/ \left[\sum_i N_i M_i^n\right]$$

where $N_i$ is the number of molecules having a molecular weight $M_i$. When n=0, M is the number average molecular weight $M_n$. When n=1, M is the weight average molecular weight $M_w$. When n=2, M is the Z-average molecular weight $M_z$. The desired MWD function (e.g., $M_w/M_n$ or $M_z/M_w$) is the ratio of the corresponding M values. Measurement of M and MWD is well known in the art and is discussed in more detail in, for example, Slade, P. E. Ed., Polymer Molecular Weights Part II, Marcel Dekker, Inc., NY, (1975) 287-368; Rodriguez, F., Principles of Polymer Systems 3rd ed., Hemisphere Pub. Corp., NY, (1989) 155-160; U.S. Pat. No. 4,540,753; Verstrate et al., Macromolecules, vol. 21, (1988) 3360; and references cited therein.

In embodiments of the LEEP copolymer, the LEEP copolymer is included having a weight average molecular weight ($M_w$) of from 15,000-5,000,000, or from 20,000 to 1,000,000 and a molecular weight distribution $M_w/M_n$ (sometimes referred to as a "polydispersity index" (PDI)) ranging from a lower limit of 1.5 or 1.8 to an upper limit of 40 or 20 or 10 or 5 or 3.

The test method for measuring the triad of the LEEP copolymer as described in U.S. Pat. No. 6,525,157 from column 6, line 37 to column 7, line 44 is:

An ancillary procedure for the description of the tacticity of the propylene units of the LEEP copolymer is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present LEEP copolymers as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$mm\ \text{Fraction} = PPP(mm)/[PPP(mm) + PPP(mr) + PPP(rr)]$$

where PPP(mm), PPP(mr) and PPP(rr) denote peak areas derived from the methyl groups of the second units in the following three propylene unit chains consisting of head-to-tail bonds:

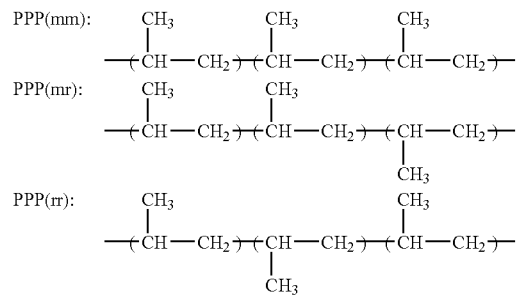

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350.

In the first region, the methyl group of the second unit in the three propylene unit chain represented by PPP (mm) resonates.

In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm).

In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

Calculation of the Triad Tacticity and Errors in Propylene Insertion: The calculation of the triad tacticity is outlined in the techniques shown in U.S. Pat. No. 5,504,172. Subtraction of the peak areas for the error in propylene insertions (both 2.1 and 1.3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The LEEP copolymers have a triad tacticity of three propylene units, as measured by $^{13}C$ NMR, of greater than 75%, or greater than 80%, or greater than 82%, or greater than 85%, or greater than 90%.

The test method for measuring the stereo- and regio-errors in insertion of propylene (e.g., the proportion of inversely inserted propylene units based on 1.3 insertions and/or 2.1 insertions of the propylene) for the LEEP copolymer is described in U.S. Pat. No. 6,525,157 from column 7, line 45 to column 9, line 29. The proportion of the 2,1-insertions to all of the propylene insertions in the LEEP copolymer may be calculated by the following formula with reference to article in the journal Polymer, vol. 30 (1989), p. 1350:

$$\text{Proportion of inversely inserted unit based on 2,1-insertion (\%)} = \frac{0.25 I_{\alpha\beta}(\text{structure}(i)) + 0.5 I_{\alpha\beta}(\text{structure}(ii))}{I_{\alpha\alpha} + I_{\alpha\beta}(\text{structure}(ii)) + 0.5(I_{\alpha\gamma} + I_{\alpha\beta}(\text{structure}(i)) + I_{\alpha\delta}} \times 100$$

Naming of the peaks in the above formula was made in accordance with a method by Carman, et al. in the journal Rubber Chemistry and Technology, volume 44 (1971), page 781, where $I_{\alpha\delta}$ denotes a peak area of the $\alpha\delta^+$ secondary carbon peak. It is difficult to separate the peak area of Iabp (structure (i)) from $I_{\alpha\beta}$ (structure (ii)) because of overlapping of the peaks. Carbon peaks having the corresponding areas can be substituted therefore.

The measurement of the 1.3 insertion requires the measurement of the βγ peak. Two structures can contribute to the βγ peak: (1) a 1.3 insertion of a propylene monomer; and (2) from a 2.1-insertion of a propylene monomer followed by two ethylene monomers. This peak is described as the 1.3 insertion peak and we use the procedure described in U.S. Pat. No. 5,504,172, which describes this βγ peak and understand it to represent a sequence of four methylene units. The proportion (%) of the amount of these errors was determined by dividing the area of the βγ peak (resonance in the vicinity of 27.4 ppm) by the sum of all the methyl group peaks and ½ of the area of the βγ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of .α.-olefins of three or more carbon atoms in the presence of a chiral metallocene catalyst, 2.1-insertion or 1.3-insertion takes place in addition to the usual 1.2-insertion, such that inversely inserted units such as a 2.1-insertion or a 1.3-insertion are formed in the olefin polymer molecule (see, Macromolecular Chemistry Rapid Communication, Volume 8, page 305 (1987), by K. Soga, T. Shiono, S. Takemura and W. Kaminski).

The proportion of inversely inserted propylene units of LEEP copolymers, based on the 2.1-insertion of a propylene monomer in all propylene insertions, as measured by $^{13}C$ NMR, is greater than 0.5%, or greater than 0.6%.

The proportion of inversely inserted propylene units of embodiments of our LEEP copolymers, based on the 1.3-insertion of a propylene monomer, as measured by $^{13}C$ NMR, is greater than 0.05%, or greater than 0.06%, or greater than 0.07%, or greater than 0.08%, or greater than 0.085 percent.

The test method for measuring the reactivity ratios of the LEEP copolymer as described in U.S. Pat. No. 6,525,157 from column 11, lines 10-60 uses monomer sequence distribution. Starting with a polymer having a known average composition, the monomer sequence distribution can be determined using spectroscopic analysis. Carbon 13 nuclear magnetic resonance spectroscopy ($^{13}C$ NMR) can be used for this purpose, and can be used to establish diad and triad distribution via the integration of spectral peaks. (If $^{13}C$ NMR is not used for this analysis, substantially lower $r_1 r_2$ products are normally obtained.) The reactivity ratio product is described more fully in Textbook of Polymer Chemistry, F. W. Billmeyer, Jr., Interscience Publishers, New York, p. 221 et seq. (1957).

The reactivity ratio product $r_1 r_2$, where $r_1$ is the reactivity of ethylene and $r_2$ is the reactivity of propylene, can be calculated from the measured diad distribution (PP, EE, EP and PE in this nomenclature) by the application of the following formulae:

$$r_1 r_2 = 4 \, [EE][PP]/[EP]^2$$

$$r_1 = K_{11}/K_{12} = 2 \times [EE]/[EP]$$

$$r_2 = K_{22}/K_{21} = 2 \times [PP]/[EP]$$

$$P = [PP] + [EP]/2$$

$$E = [EE] + [EP]/2$$

where
Mol. % $E = [(E)/(E+P)]*100$;
$X = E/P$ in reactor;
$K_{11}$ and $K_{12}$ are kinetic insertion constants for ethylene; and
$K_2$, and $K_2$, are kinetic insertion constants for propylene.

As is known to those skilled in the art, a reactivity ratio product $r_1 r_2$ of 0 can define an "alternating" copolymer, and a reactivity ratio product of 1 is said to define a "statistically random" copolymer. In other words, a copolymer having a reactivity ratio product $r_1 r_2$ of between 0.6 and 1.5 is generally said to be random (in strict theoretical terms, generally only a copolymer having a reactivity ratio product $r_1 r_2$ greater than 1.5 contains relatively long homopolymer sequences and is said to be "blocky"). The LEEP copolymers will have a reactivity ratio product $r_1 r_2$ of less than 1.5, or less than 1.3, or less than 1.0, or less than 0.8. The substantially uniform distribution of comonomer within polymer chains of the LEEP copolymer generally precludes the possibility of significant amounts of propylene units or sequences within the polymer chain for the molecular weights (weight average) disclosed herein.

The test method for measuring the intermolecular tacticity of the LEEP copolymer is described in U.S. Pat. No. 6,525,157 from column 9, line 42 to column 10, line 15. The LEEP copolymers may have a statistically insignificant intermolecular difference of tacticity of polymerized propylene between different chains (intermolecularly). This is determined by thermal fractionation by controlled dissolution generally in a single solvent, at a series of slowly elevated temperatures. A typical solvent is a saturated hydrocarbon such as hexane or heptane. These controlled dissolution procedures are commonly used to separate similar polymers of different crystallinity due to differences in isotactic propylene sequences, as shown in the article in Macromolecules, Vol. 26, p 2064 (1993). For the LEEP copolymers where the tacticity of the propylene units determines the extent of crystallinity, we expected this fractionation procedure will separate the molecules according to tacticity of the incorporated propylene.

In the LEEP copolymer, at least 75% by weight, or at least 80% by weight, or at least 85% by weight, or at least 90% by weight, or at least 95% by weight, or at least 97% by weight, or at least 99% by weight of the copolymer is soluble in a single temperature fraction, or in two adjacent temperature fractions, with the balance of the copolymer in immediately preceding or succeeding temperature fractions. These percentages are fractions, for instance in hexane, beginning at ° C. and the subsequent fractions are in approximately 8° C. increments above 23° C. Meeting such a fractionation requirement means that a polymer has statistically insignificant intermolecular differences of tacticity of the polymerized propylene.

Fractionations have been done where boiling pentane, hexane, heptane and even di-ethyl ether are used for the fractionation. In such boiling solvent fractionations, LEEP copolymers will be totally soluble in each of the solvents, offering no analytical information. For this reason, the fractionation should be performed as described above and as detailed herein, to find a point within these traditional fractionations to more fully describe the copolymer and the surprising and unexpected insignificant intermolecular differences of tacticity of the polymerized propylene copolymer.

The test method for measuring the solid state proton nuclear magnetic relaxation time of the LEEP copolymer is described in U.S. Pat. No. 6,525,157 from column 12, line 10 to 60 and Table I.

The principle of solid state proton NMR relaxation time ($^1$H NMR $T_{1p}$) and its relationship with polymer morphology have been discussed in Macromolecules 32 (1999), 1611. The experimental $T_{1p}$ relaxation data of the LEEP copolymer, and polypropylene (PP) homopolymer (control sample) are shown in U.S. Pat. No. 6,525,157 FIG. 1, which plots the natural log of the crystalline intensity versus time; the experimental procedure for collecting these data is described below. To fit the data with single exponential function, linear regression was performed on the ln(I) vs. t data, where I is the intensity of the crystalline signal. Then, the quality of the fit, $R^2$, is calculated. The $R^2$ for a perfect linear correlation is 1.0. The $R^2$ for polypropylene (control) and an exemplary LEEP copolymer are 0.9945 and 0.9967, respectively. Therefore, the $T_{1p}$ relaxation for both polypropylene homopolymer and an exemplary LEEP copolymer can be well fitted by a single-exponential. From the fit, the $T_{1p}$ of polypropylene and LEEP copolymer, are calculated as 25 milliseconds (ms) and 8.7 ms, respectively. The large difference in the $T_{1p}$ is reflective of their difference in morphology.

The hypothetical polypropylene-like regions would have $T_{1p}$ relaxation similar to that in polypropylene homopolymer. As a result, should such regions exist in embodiments of the LEEP copolymers, the $T_{1p}$ relaxation would contain a component that has a $T_{1p}$ relaxation time characteristic of polypropylene homopolymer (i.e., $T_{1p}$=25 ms). As seen in FIG. 1 of U.S. Pat. No. 6,525,157 the relaxation of the LEEP copolymer can only be well fitted by a single exponential. Incorporation of a component whose $T_{1p}$=25 ms would deteriorate the fit. This demonstrates that the LEEP copolymers of do not contain long continuous isotactic propylene units. In certain LEEP copolymers, the $T_{1p}$, relaxation time can be less than 18 ms, or less than 16 ms, or less than 14 ms, or less than 12 ms, or less than 10 ms.

$T_{1p}$ Measurement: The experiments are performed on a Bruker DSX-500 Nuclear Magnetic Resonance (NMR) spectrometer, with a $^1$H frequency of 500.13 MHz and $^{13}$C frequency of 125.75 MHz. The pulse sequence was a 90° ($^1$H) pulse followed by spin lock and cross polarization ("CP"; time=0.1 ms). A spin lock field strength of $\gamma_1=2\pi*60$ kHz is used. After the spin lock, the magnetization is transferred to $^{13}$C by CP and then the signal is detected. The crystalline methine signal at 26.7 ppm is recorded and normalized and its natural logarithm (Ln) is plotted against spin lock time.

The ethylene concentration of the LEEP copolymer may be measured according to ASTM D3900 as described in U.S. Pat. No. 6,525,157 from column 18, line 61 to column 19, line 12 as ethylene wt. % according to ASTM D3900 as follows. A thin homogeneous film of the copolymer component, pressed at a temperature of at or greater than 150° C., is mounted on a Perkin Elmer PE 1760 infra red spectrophotometer. A full spectrum of the sample from 600 cm$^{-1}$ to 4000 cm$^{-1}$ is recorded, and the ethylene weight percent of the copolymer component is calculated from:

$$\text{Ethylene wt. \%}=82.585-111.98X+30.045X^2$$

where X is the ratio of the peak height at 1155 cm$^{-1}$ to peak height at either 722 cm$^{-1}$ or 732 cm$^{-1}$, which ever is higher.

Another example of a propylene elastomer which may be used is a regio-error containing propylene-ethylene copolymer (i.e., a R-EPE copolymer) as described in U.S. Patent Application Publication No. 2003/0204017 (published Oct. 30, 2003).

As disclosed in U.S. Patent Application Publication No. 2003/0204017 (published Oct. 30, 2003) paragraph [0006], the R-EPE copolymers may be characterized as comprising at least about 60 weight percent (wt %) of units derived from propylene, about 0.1-35 wt % of units derived from ethylene, and 0 to about 35 wt % of units derived from one or more unsaturated comonomers, with the proviso that the combined weight percent of units derived from ethylene and the unsaturated comonomer does not exceed about 40. These copolymers are also characterized as having at least one of the following properties: (i) $^{13}$C NMR peaks corresponding to a regio-error at about 14.6 and about 15.7 ppm, the peaks of about equal intensity, (ii) a B-value greater than about 1.4 when the comonomer content, i.e., the units derived from ethylene and/or the unsaturated comonomer(s), of the copolymer is at least about 3 wt %, (iii) a skewness index, $S_{ix}$ greater than about −1.20, (iv) a DSC curve with a $T_{me}$ that remains essentially the same and a $T_{max}$ that decreases as the amount of comonomer, i.e., the units derived from ethylene and/or the unsaturated comonomer(s), in the copolymer is increased, and (v) an X-ray diffraction pattern that reports more gamma-form crystals than a comparable copolymer prepared with a Ziegler-Natta (Z-N) catalyst. Typically the copolymers of this embodiment are characterized by at least two, preferably at least three, more preferably at least four, and even more preferably all five, of these properties.

The measurement of the $^{13}$C NMR peaks corresponding to a regio-error at about 14.6 and about 15.7 ppm is described in U.S. Patent Application Publication No. 2003/0204017 (published Oct. 30, 2003) paragraph 128: The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^1$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

The skewness index of the R-EPE copolymer is related to the shape of the curve for the temperature-rising elution fractionation test and can be determined using the method described in U.S. Patent Application Publication No. 2003/0204017 (published Oct. 30, 2003) paragraphs 112-116:

The determination of crystallizable sequence length distribution can be accomplished on a preparative scale by temperature-rising elution fractionation (TREF). The relative mass of individual fractions can be used as a basis for estimating a more continuous distribution. L. Wild, et al., Journal of Polymer Science: Polymer. Physics Ed., 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. The following table is a summary of conditions used for the analysis of copolymers of propylene. Except as noted the conditions for TREF are consistent with those of Wild, et al., ibid, and Hazlitt, Journal of Applied Polymer Science: Appl. Polymer Symp., 45, 25 (1990).

Parameters Used for TREF Parameter Explanation. Column type and size: stainless steel shot with 1.5 cc interstitial volume; mass detector: single beam infrared detector at 2920 cm$^{-1}$; injection temperature: 150° C.; temperature control device: GC oven; solvent: 1,2,4-trichlorobenzene; concentration: 0.1 to 0.3% (weight/weight); cooling rate 1: (140° C. to 120° C.) @-6.0° C./min; cooling rate 2: (120° C. to 44.5° C.) @-0.1° C./min; cooling rate 3: (44.5° C. to 20° C.) @-0.3° C./min; heating rate: (20° C. to 140° C.) @ 1.8° C./min; data acquisition rate: 12/min.

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature. U.S. Patent Application Publication No. 2003/0204017 (published Oct. 30, 2003) FIG. 5 is a representation of the typical type of distribution one would expect for a propylene/ethylene copolymer made with a metallocene polymer and an example of the R-EPE copolymer.

The shape of the metallocene curve in FIG. 5 is typical for a homogeneous copolymer. The shape arises from the inherent, random incorporation of comonomer. A prominent characteristic of the shape of the curve is the tailing at lower elution temperature compared to the sharpness or steepness of the curve at the higher elution temperatures. A statistic that reflects this type of asymmetry is skewness. Equation 1 mathematically represents the skewness index, $S_{ix}$, as a measure of this asymmetry.

$$S_{ix} = \frac{[\sum w_i^*(T_i - T_{max})^3]^{1/3}}{[\sum w_i^*(T_i - T_{max})^2]^{1/2}} \quad \text{(Equation 1)}$$

The value, $T_{max}$, is defined as the temperature of the largest weight fraction eluting between 50 and 90° C. in the TREF curve. $T_i$ and $w_i$ are the elution temperature and weight fraction respectively of an arbitrary, i$^{th}$ fraction in the TREF distribution. The distributions have been normalized (the sum of the $w_i$ equals 100%) with respect to the total area of the curve eluting above 30° C. Thus, the index reflects only the shape of the crystallized polymer and any uncrystallized polymer (polymer still in solution at or below 30° C.) has been omitted from the calculation shown in Equation 1.

The measurement of $T_{me}$ and $T_{max}$ of the R-EPE copolymer is described in U.S. Patent Application Publication No. 2003/0204017 (published Oct. 30, 2003) paragraphs [0098] to [0100]:

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). Certain of the R-EPE copolymers are characterized by a DSC curve with a $T_{me}$ that remains essentially the same and a $T_{max}$ that decreases as the amount of unsaturated comonomer in the copolymer is increased. $T_{me}$ means the temperature at which the melting ends. $T_{max}$ means the peak melting temperature.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 110° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C.

at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The polypropylene samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest.

The measurement of $T_{me}$ and $T_{max}$ of the R-EPE copolymer is described in U.S. Patent Application Publication No. 2003/0204017 (published Oct. 30, 2003) paragraphs [0102] to [0105]:

"High B-value" and similar terms mean the ethylene units of a copolymer of propylene and ethylene, or a copolymer of propylene, ethylene and at least one unsaturated comonomer, is distributed across the polymer chain in a nonrandom manner. B-values range from 0 to 2 with 1 designating a perfectly random distribution of comonomer units. The higher the B-value, the more alternating the comonomer distribution in the copolymer. The lower the B-value, the more blocky or clustered the comonomer distribution in the copolymer. The high B-values of the R-EPE copolymers are typically at least about 1.3, preferably at least about 1.4, more preferably at least about 1.5 and most preferably at least about 1.7. The B-value is calculated as follows.

B is defined for a propylene/ethylene copolymer as:

$$B = \frac{f(EP + PE)}{2 F_E F_P}$$

where f(EP+PE)=the sum of the EP and PE diad fractions; and $F_E$ and $F_P$=the mole fraction of ethylene and propylene in the copolymer, respectively. B-values can be calculated for other copolymers in an analogous manner by assignment of the respective copolymer diads. For example, calculation of the B-value for a propylene/1-octene copolymer uses the following equation:

$$B = \frac{f(EO + PO)}{2 F_O F_P}$$

For propylene polymers made with a metallocene catalyst, the B-values are typically between 1.1 and 1.3. For propylene polymers made with a constrained geometry catalyst, the B-values are typically between 0.9 and 1.0. In contrast, the B-values of the R-EPE copolymers, typically made with an activated nonmetallocene, metal-centered, heteroaryl ligand catalyst, are above about 1.4, typically between about 1.5 and about 1.85. In turn, this means that for any R-EPE copolymers, not only is the propylene block length relatively short for a given percentage of ethylene but very little, if any, long sequences of 3 or more sequential ethylene insertions are present in the copolymer, unless the ethylene content of the polymer is very high.

In one aspect of the invention, the second thermoplastic component may preferably include a copolymer that includes propylene and at least one α-olefin. As used herein, unless specifically stated otherwise, a copolymer may include two, three or more different monomer units (i.e. a copolymer includes terpolymers, and polymers containing four or more different monomers). For example, one preferred copolymer is a propylene containing elastomer that includes at least about 50 percent by weight of the copolymer of units derived from propylene monomer and at least about 5 percent by weight of the copolymer of units derived from one or more comonomers other than propylene, e.g., ethylene (i.e., the propylene containing elastomer may be an ethylene elastomer which contains at least about 50 wt. % propylene). The propylene containing elastomer may have an ethylene concentration of less than about 40 wt. % based on the total weight of the propylene containing elastomer. Preferably, the propylene containing elastomer includes an ethylene content of at least about 5 wt. %, more preferably at least about 7 wt. %, and still more preferably about 9 wt. % based on the weight of the propylene containing elastomers. The propylene containing elastomer also may have an ethylene concentration of less than about 40 wt. %, more preferably less than about 30 wt. %, still more preferably less than about 20 wt. %, and most preferably less than about 15 wt. % based on the total weight of the propylene containing elastomer. For example, the ethylene concentration may range from about 5 to about 40 wt. %, more preferably from about 7 to about 30 wt. %, more preferably from about 7 to about 20 wt. % and most more preferably from about 9 to about 15 wt. % based on the total weight of the propylene containing elastomer.

The second polymeric component (e.g., the ethylene elastomer, or even the propylene containing elastomer) may contain a polymer having a peak melting temperature (as measured for example by differential scanning calorimetry at a rate of about 10° C./min on a 3 mg sample of the polymer which is first cooled from 230° C. to about 0° C. at a rate of −10'/min) less than about 105° C., preferably less than about 100° C., more preferably less than about 90° C., and most preferably less than about 82° C. (e.g., the peak melting temperature may be less than about 65° C.).

The propylene elastomer selected for the second polymeric component may exhibit a Shore A hardness according to ASTM D 2240-05 of at least about 45, preferably at least about 55, more preferably at least about 60, and still more preferably at least about 65. The Shore A hardness may also be less than about 95, preferably less than about 90, more preferably less than about 85, and still more preferably less than about 80. For example, the hardness (in units of Shore A) of the propylene elastomer may range from about 65 to about 95, more preferably from about 65 to about 85, and still more preferably from about 65 to about 80.

Examples of suitable propylene elastomers which may be used in the second polymeric component include soft thermoplastics containing greater than about 50 wt. % (e.g., greater than 60 wt. %) propylene monomer and greater than about 5 wt. % ethylene monomer and may be characterized by a peak melting temperature from about 35° C. to about 130° C. (e.g. from about 40° C. to about 110° C.) as measured by differential scanning calorimetry. Such elastomers are commercially available from THE DOW CHEMICAL COMPANY under the designation of VERSIFY® (e.g., including 2400, 3000, 3200, 3300, 3401, and 4301) and from EXXONMOBIL CHEMICAL COMPANY under the designation of VISTAMAXX®.

Olefinic Block Copolymer/LOA/α-Olefin Interpolymer
Olefinic Block Polymer/Ethylene/α-Olefin Interpolymer In one aspect of the invention, the second polymeric component may include an multi-block polymer having a plurality of blocks, including a hard block having a relatively high crystallinity and a soft block having a crystallinity lower than the hard block. The multi-block polymer (e.g., the multi-block olefenic polymer) may be a homopolymer including essentially one (e.g., one) α-olefin monomer or copolymer including two α-olefin monomers a terpolymer including three or more monomers (which typically contain at least two monomers that are α-olefins and may even contain three α-olefins) or may contain four or more of α-olefin monomers. A multi-block homopolymer may contain hard and soft blocks having the same monomer, the differences in the blocks being the regularity of the monomers (e.g., the hard block may have monomers which are more regularly oriented than the soft block, so that the hard block has a higher crystallinity). An olefinic block copolymer may contain blocks having different concentrations of monomers. For example, an olefinic block copolymer may have one or more hard blocks which contains a high concentration (e.g., greater than about 80 wt. %, preferably greater than about 90 wt. %, more preferably greater than about 95 wt. %, and most preferably greater than about 99 wt. %, or even 100 wt. % of the olefinic block copolymer) of a first α-olefinic monomer and a low concentration of a second α-olefin monomer and one or more soft blocks which contain a concentration of the first α-olefin which is lower than the in the one or more hard blocks. Preferably the first α-olefin is a lower α-olefin (LOA) which is ethylene or propylene, such that the olefinic block copolymer is a LOA/α-olefin interpolymer. Without limitation, the olefinic block copolymer may be an ethylene/α-olefin interpolymer or a propylene/α-olefin interpolymer. Examples of LOA/α-olefin interpolymer which may be used in the second polymeric component are described in PCT International Patent Publication Nos. WO2006/102155A2 (filed Mar. 15, 2006), WO2006/101966A1 (filed Mar. 15, 2006), and WO2006101932A2 (filed Mar. 15, 2006), all of which are expressly incorporated herein by reference in there entirety.

Ethylene/α-Olefin Interpolymers

Ethylene/α-olefin interpolymers suitable for use in the second polymeric component include ethylene and one or more copolymerizable α-olefin comonomers in polymerized form, characterized by multiple blocks or segments of two or more polymerized monomer units differing in chemical or physical properties (block interpolymer), preferably a multi-block copolymer.

Without limitation, exemplary ethylene/α-olefin interpolymers suitable for use in the polymeric composition of the invention may be characterized by a melting point, Tm, which is higher than the melting point of a random copolymer having the same density, d. For example, the ethylene/α-olefin interpolymers may have at least one melting point, Tm, in degrees Celsius and density, d, in grams/cubic centimeter, wherein the numerical values of the variables correspond to the relationship: $Tm \geq 1000(d)-800$, and preferably $Tm \geq -2002.9+4538.5(d)-2422.2(d)^2$, and more preferably $Tm \geq -6288.1+13141(d)-6720.3(d)^2$, and most preferably $Tm \geq 858.91-1825.3(d)+1112.8(d)^2$.

Preferably, the ethylene/α-olefin interpolymers suitable for use in the polymeric composition of the invention have a Mw/Mn from about 1.7 to about 3.5 and at least one melting point, Tm, in degrees Celsius and density, d, in grams/cubic centimeter, wherein the numerical values of the variables correspond to the relationship: $Tm \geq 1000(d)-800$, and preferably $Tm > -2002.9+4538.5(d)-2422.2(d)^2$, and more preferably $Tm \geq -6288.1+13141(d)-6720.3(d)^2$, and most preferably $Tm \geq 858.91-1825.3(d)+1112.8(d)^2$.

Crystallinity

As gleaned from this discussion, a portion of the first polymeric component, the second polymeric component, or both includes a portion of the material that is crystalline. Preferably, a portion of the first polymeric component has a relatively high crystalline, a portion of the second polymeric component has a relatively low crystalline, or both For example, the crystallinity of the first polymeric component may be greater than about 12%, preferably greater than about 15%, more preferably greater than about 20%, and most preferably greater than about 24%, (e.g., greater than about 35 wt. %). The crystallinity of the second polymeric component may be less than about 30 wt. %, preferably less than about 14 wt. % more preferably less than about 11 wt. %, and most preferably less than about 9 wt. % (e.g., less than about 7 wt. %).

Percent crystallinity herein can be measured by differential scanning calorimetry, according to ASTM D 3418.03 or ISO 11357-3. By way of example, a milligram size sample of polymer is sealed into an aluminum DSC pan. The sample is placed into a DSC cell with a 25 cubic centimeter per minute nitrogen purge and cooled to −100° C. A standard thermal history is established for the sample by heating at 10° C./minute to 225° C. The sample is then cooled (at 10° C./minute) to −100° C. and reheated at 10° C./minute to 225° C. The observed heat of fusion for the second scan is recorded ($\Delta H_{observed}$). The observed heat of fusion is related to the degree of crystallinity in weight percent based on the weight of the sample by the following equation:

$$\% \text{ Crystallinity} = \frac{\Delta H_{observed}}{\Delta H_{known}} \times 100,$$

where the value for $\Delta H_{known}$ is a literature reported established reference value for the polymer. For example, heat of fusion for isotactic polypropylene has been reported in B. Wunderlich, Macromolecular Physics, Volume 3, Crystal Melting, Academic Press, New York, 1980, p. 48, is $\Delta H_{known}=165$ Joules per gram of polypropylene polymer; and the heat of fusion for polyethylene has been reported in F. Rodriguez, Principles of Polymer Systems, $2^{nd}$ Edition, Hemisphere Publishing Corporation, Washington, 1982, p. 54, is $\Delta H_{known}=287$ Joules per gram of polyethylene polymer. The value of $\Delta H_{known}=165$ J/g may be used for polymers containing greater than about 50 mole % propylene monomer and the value of $\Delta H_{known}=287$ J/g may be used for polymers containing greater than about 50 mole % ethylene monomers.

Reinforcement Material

The composition of the present invention further includes a reinforcement material and particularly a reinforcement material, such as one or more glass fibrous materials (e.g., short glass fibers, long glass fibers, or both), or other fibers (e.g., steel, carbon, the like, or otherwise), platelets (e.g., talc, wollastonite, the like, or otherwise), or combinations thereof. Preferably, the fibers will be substantially, uniformly distributed throughout the final composition. However, it may be possible to selectively locate fibers in one or more predetermined locations within the compositions.

The fibrous reinforcement material, the glass fibers, or both may be present at a concentration of at least about 5 wt. %, preferably at least about 10 wt. %, more preferably at least about 15 wt. %, and most preferably at least about 20 wt. % based on the total weight of the polymeric composition. The fibrous reinforcement material, the glass fibers, or both may be present at a concentration of less than about 70 wt. %, preferably less than about 50 wt. %, more preferably less than about 45 wt. %, and most preferably less than about 40 wt. % (e.g., less than about 35 wt. %) based on the total weight of the polymeric composition.

It will be appreciated that in resulting final composition (e.g., in the resulting compositions or articles following a shaping step such as injection molding), fiber lengths may be reduced relative to the initial fiber length. The average fiber lengths in the final composition may be greater than about 0.5 mm, preferably greater than about 1 mm, and more preferably greater than about 2 mm. For example average fiber length may range from about 0.5 to about 5 mm, or from about 1 mm to about 3 mm. In the final composition, the glass fibers may also have a shorter length, e.g., the glass fibers may have an average length from about 1 mm to about 2 mm, or even lower. Preferably, at least about 50 percent by weight of the fibers will be longer than 1 mm, and more preferably at least about 65 (or even about 75) percent by weight of the fibers will be longer than about 1 mm. Fiber diameters typically will range from about 3 to about 100 microns, and more specifically about 5 to about 25 microns (e.g., about 17 microns). Without limitation, the glass may be one or more of E-glass, S-glass, T-glass, AR-glass, C-glass, R-glass or otherwise.

It is also contemplated that the polymeric composition optionally can include one or more additives such as a surfactant, a flexibilizer, a coupling agent, a flame retardant, an ignition resistant additive, a stabilizer, a colorant, an antioxidant, a mold release agent, an anti-static agent, a slip-aid (i.e., slip resistance aid), a flow enhancer, a nucleating agent, a clarifying agent, or any combination thereof. For example, one or more pigments or colorants may be added to the polymeric composition such that the parts or components are "molded-in-color." By way of example, colorants may be added to the fibrous reinforcement material. One preferred additive is a colorant, which when included is present, in a relatively small weight percentage of the overall resulting composition (e.g., less than about 5 weight percent or even less than about one weight percent). For example, the colorant may be for achieving a black appearance, a gray flannel appearance, or otherwise. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize thermoplastic compositions against degradation caused by, but not limited to heat, light, and oxygen, or a mixture thereof may be used. One preferred additive is antioxidant, which, when included, is typically included in a relatively small weight percentage of the overall polymeric composition (e.g., less than about 1 or 2 percent). An example of one preferred commercially available antioxidant is IRGANOX B225 antioxidant commercially available from Ciba Specialty Chemicals Corporation. Irganox B225 antioxidant is a blend of 1 part Irganox 1010 antioxidant (Tetrakis(methylene(3,5-di-t-butyl-4-hydroxyhydrocinnamate))methane) and 1 part Irgafos 168 tris(2,4-t-butylphenyl) phosphite. Another preferred additive is a demolding agent (e.g., a wax, mold relief, slip-aid, the like, or otherwise). One preferred demolding agent is a nitrogen or ammonia group containing compound such as an amine or an amide. One preferred amide containing compound is ethylene bis-stearamide (EBS). Another preferred category of mould release agents is "stearates" such as Glycerol MonoStearate commercially available from Danisco or Ciba Specialty Chemicals under the tradename Atmer. One preferred nitrogen containing compound, which is a wax, is an erucamide sold under the tradename KENAMIDE ULTRA E, commercially available from Chemtura Corporation, Middlebury, Conn.

One preferred additive is a coupling agent, e.g., a grafted polypropylene coupling agent such as maleic anhydride, grafted polypropylene coupling agent (e.g., Polybond 3200 from Chemtura or OREVAC CA-100 from Arkema). Optionally, the polymeric composition of the present invention may include a coupling agent or be free of a coupling agent. When included, the coupling agent will be present in the resulting overall composition in an amount less than about 5 percent by weight, and more preferably less than about 2 percent by weight. For example, it may be present in an amount of at least 0.01 percent by weight or even at least about 0.1 percent by weight of the overall composition.

As discussed herein, the polymeric composition of the present invention includes a first polymeric component, a second polymeric component, and a fibrous reinforcement material. It will be appreciated that a ratio of the first polymeric component with respect to the second polymeric component exceeds 10:42, and more specifically exceeds 10:27. Preferably, the ratio of the first polymeric component to the second polymeric component ranges from about 10:2 to about 10:42, more preferably about 10:2 to about 10:27.

The resulting polymeric compositions herein can be prepared according to any suitable technique for achieving the desired properties in a blended compound. Combinations of two or more ingredients may be compounded (e.g., first polymeric component and reinforcement material) prior to feeding the materials to processing equipment (e.g., before introduction into an injection molding apparatus). Alternatively, or in addition, two or more of the ingredients may be compounded with each other while within the processing equipment. For example, the polymeric components of the resulting composition are not melt-blended with each other until they are in the processing equipment (e.g., within a screw and barrel assembly, a mixing nozzle, injection machine, the like or otherwise). Preparation of the compositions of this invention can be accomplished using any suitable mixing means, including dry blending two or more of the individual components, melt blending, or both either directly in an apparatus used to make the finished article (e.g., the automotive part), or in a separate apparatus (e.g., premixing in a Banbury mixer). Dry blends of the compositions can also be directly injection molded without pre-melt blending step. In one preferred embodiment, the formation of the polymeric composition includes mixing at least two components (e.g., the second polymeric component and the reinforcement concentrate) or mixing at least three components (e.g., first polymeric component, second polymeric component, and the reinforcement material) at the molding machine, (e.g., blending at the press). Optionally or in addition to, two or more ingredients may pre-compounded in a compounding unit prior to mixing at the molding machine.

As discussed above, the ingredients in the polymeric composition may also be compounded or melt blended in a mixer such as Banbury mixer, or in an extruder such as a kneader, a compounding single screw extruder, a twin screw extruder, a heated two-roll mill, and the like. In one aspect of the invention, after compounding the ingredients, the blended polymeric material may be pelletized to form granules or pellets which are capable of being fed into a molding machine. A quantity (e.g., greater than 5 kg, preferably greater than 20 kg, or even greater than 250 kg) of the pellets or granules may be placed in a container, and stored or transported prior to molding an article.

When softened or melted by the application of heat, the polymeric compositions of this invention can be fabricated into articles using conventional techniques such as compression molding, injection molding, gas assisted injection molding, calendering, vacuum forming, thermoforming, extrusion, blow molding, alone or in combination. The polymeric compositions can also be formed, spun, or drawn into films, fibers, multi-layer laminates or extruded sheets, or can be compounded with one or more organic or inorganic substances, on any machine suitable for such purpose. In a particularly preferred embodiment, the polymeric compositions of the present invention are preferably injection molded to form a shaped resulting article, with or without an accompanying insert (e.g., as part of an insert molding process), or as part of an over-molded article.

In one preferred embodiment, it is contemplated that the first polymeric component and the second polymeric component (e.g., the elastomer), are not pre-compounded with each other in molten state prior to feeding them to an apparatus for preparing a shaped article. Rather they are admixed with each other, and first subjected to melt-blending, only upon being introduced to the apparatus (e.g., during mixing in a screw and barrel assembly of an injection molding machine).

It is possible the reinforcement material may be added in a loose individual state, or even as bundles of materials (e.g., fibers). Preferably, the reinforcement material is incorporated into the mixture as part of a cohesive concentrate form that includes the reinforcement material dispersed in a matrix of polymeric material that is compatible with or the same as the other polymeric components (e.g., first polymeric component) of the resulting overall composition. By way of example, it is contemplated that a fibrous (e.g., glass fibers) reinforcement concentrate may be utilized, wherein the fibrous phase is distributed in a polymeric matrix phase, such as a matrix phase that includes one or more of the polymeric material discussed herein, such as a polypropylene homopolymer. The fibrous phase is present in an amount of at least about 20 percent by weight, and more preferably greater than 50 percent by weight (e.g., about 50 to about 90 percent by weight, such as about 60 percent by weight) of the concentrate. An example of one such concentrate of fibrous reinforcement material is discussed in U.S. Patent Application Ser. No. 60/890,002, filed Aug. 16, 2007, which is hereby incorporated by reference for all purposes.

It is contemplated in one exemplary embodiment, that the polymeric composition may include the first polymeric component, the second polymeric component having an ethylene content, and the reinforcement concentrate having the reinforcement material and the polymeric matrix that includes additional polymeric material. In another exemplary embodiment, the polymeric composition may include the second polymeric component having an ethylene content, and the reinforcement concentrate having a polymeric matrix that includes the first polymeric component.

One approach is to employ fibers that are pre-treated or otherwise modified to improve one or more of their characteristics. For example, one approach is to coat the fibers with a chemical agent (e.g., a coupling agent, a surface property modifier, a stabilizer, or other suitable agent). By way of one specific example, fibers may be treated with a sizing agent for physically, chemically, or both improving the tenacity of the subsequent interfacial bond with a polymeric matrix, for protecting the surface of the fibers from damage or both. The sizing will typically include a suitable film forming agent, a coupling agent (e.g., a silane such as an alkoxysilane), and optionally a lubricant or other agent. It may be possible to include for at least part of the sizing a coupling agent as described previously (e.g., including a maleic anhydride grafted polypropylene coupling agent).

Fibers may be provided as individual fibers, e.g., chopped and/or continuous fibers, that are randomly oriented relative to each other, axially aligned relative to each other, woven, or any combination thereof, and which may thereafter be dispersed into the polymeric matrix, (e.g., a thermoplastic polymeric matrix, such as one including a polypropylene homopolymer or copolymer). It is also contemplated that the fibers will be provided in a bundle, by which the fibers are generally axially aligned.

The fibrous reinforcement concentrate material herein may be any suitable size or shape. In general, it may be elongated (e.g., as a rod), granular, substantially symmetrical in shape about at least one axis, substantially asymmetrical in shape about at least one axis, substantially solid, porous, or any combination thereof. Individual particles of the fibrous reinforcement concentrate material may have their largest dimension, (e.g., length, diameter, height, width, thickness, or otherwise), about 5 mm or larger, more specifically about 8 mm or larger, and still more specifically about 10 mm or longer. Smaller sizes are also possible as well, such as less than about 1 mm, and more specifically less than about 0.5 mm.

One approach to the manufacture of the fibrous reinforcement concentrate is to impregnate a fiber bundle with the polymer such as by art disclosed pultrusion techniques. See e.g., U.S. Pat. No. 5,834,056 "Process and Apparatus for Fiber Bundle Impregnation," which is hereby incorporated by reference for all purposes.

In general, the invention herein contemplates the manufacture of a shaped article, pursuant to which the first polymeric component, the second polymeric component, and the reinforcement concentrate are fed from individual sources (e.g., hoppers) into a screw and barrel assembly of a processing apparatus. As the material travel along the assembly, they are subject to shear and heat for causing them to melt blend with each other. Optionally, a mixing nozzle is also employed in the apparatus for assisting to melt blend. The resulting melt blended ingredients are introduced into a tool that shapes the material (e.g., a die, a mold, or other structure for imparting a shape to the introduced material).

Advantageously, it has been surprisingly found that desired properties (e.g., low gloss and improved mar resistance, scratch resistance, low temperature ductility, and dimensional stability, or otherwise) can be achieved by the disclosed proportions of the fibrous reinforcement concentrate, the first polymeric component, the second polymeric component. By way of example, articles formed compositions from the present invention will achieve an article having a soft-touch feel tactile surface with superior grain reproduction (e.g., low gloss) and improved mar resistance compared to articles formed compositions known in the art. More specifically, it has been found that the article formed using a tool with an N111 texture (e.g., an Opel N111 texture) from compositions of the present invention may achieve improved characteristics of gloss (e.g., gloss measured on a N111 texture with micro matt) according to ASTM D-542 that ranges from about 0.6 to about 1.7 GU, more specifically about 0.9 to about 1.4 GU, Furthermore, it has been found that the article formed using the compositions of the present invention may achieve improved characteristics for mar resistance (e.g., mar at 6N according to GMW 14688 of less than about 2 GU, and possibly between about 0.05 and about 1 GU; scratch resistance (e.g., scratch at 10N measured on an article formed having an N111 texture with micro matt according to PV3952 of less than about 1 dL, more typically less than about 0.5 dL; scratch at 10 N (article formed having an Audi $K_{42}$ texture)

according to PV3952 of less than about 0.4 dL, dimensional stability (e.g., shrinkage of less than about 5% and possibly between 0.1% to about 1%; coefficient of linear expansion (CLTE) in flow according to ASTM D-696 ranging from about 25 to about 50 mm/mm° C. and more specifically from about 30 to about 45 mm/mm° C.; and coefficient of linear expansion (CLTE) cross flow according to ASTM D-696 ranging from about 40 to about 70 mm/mm° C. and more specifically from about 45 to about 65 mm/mm° C.), or combinations thereof. Preferably, advantageous results are achieved wherein the polymeric composition is free of grafted co-polymers, free of mineral filler (e.g., talc), free of glass particles other than glass fibers, free of peroxides, or any combination thereof.

The polymeric composition of the present invention finds many advantageous applications. The present invention accordingly contemplates articles made with the present composition and methods that include one or more steps of shaping the compositions to form articles. The articles typically will be shaped. They may have a substantially constant profile along their lengths (e.g., from extrusion). They may have shapes that vary throughout the article (e.g., to include one or more surfaces that are flat, contoured, or a combination thereof. The articles herein may be composite articles. They may be articles that are insert molded, over molded, or both. For example, the present invention can be employed as part of a variety of articles of manufacture, however, it has already been found particularly suitable for use in forming articles such as a tray, a table, a plate; lawn and garden furniture, a shoe, a boot, or the like. The polymeric composition may also be used to form automotive parts such as dash board, consoles, arm rests, switch covers, brake levers, shifters, knobs, handles, control buttons, trim panels, seat back covers, instrument housings, cup holders, a panel, sun visor, rear view mirror housing, fascia (e.g., bumper fascia), automotive trim, automotive cowling, console (e.g., center overhead, floor assemblies, or both), instrument panel, glove box assemblies including doors, knee bolster assemblies or instrument panel retainer assemblies or structural components.

Materials resulting from the teachings herein will have any combination of at least one, two (and more specifically at least 3 or all) of the following properties; namely, a flexural modulus in flow measured according to ISO 178 that ranges from about 200 to about 4000 MPa and more specifically about 350 to about 3500 MPa; flexural modulus in cross flow measured according to ISO 178 that ranges from about 50 to about 2500 MPa and more specifically about 150 to about 1950 MPa; average flexural modulus measured according to ISO 178 that ranges from about 50 to about 3000 MPa and more specifically about 150 to about 2000 MPa; Charpy Impact notched RT measured according to ISO 179-1 eU that ranges from about 5 to about 50 kJ/m$^2$ and more specifically about 11 to about 45 kJ/m$^2$; Charpy Impact notched −20° C. measured according to ISO 179-1 eU that ranges from about 1 to about 35 kJ/m$^2$ and more specifically about 4 to about 28 kJ/m$^2$; Coefficient of Friction (static) according to ASTM D-1894 that ranges from about 0.2 to about 0.7 and more specifically about 0.1 to about 0.6; and Coefficient of Friction (dynamic) measured according to ASTM D-1894 that ranges from about 0.5 to about 0.75 and more specifically about 0.2 to about 0.5. It should be appreciated that the average flexural modulus is the average of the in-flow and cross-flow modulus. By way of example, the average flexural modulus may be obtained by the cutting off test bars from a molded plaque having a film gate on one side. The test bars that are cut along the direction of the film gate are used for determining the in-flow modulus and the test bars that are cut perpendicular to the flow are used to determine the cross-flow modulus.

EXAMPLES

Examples 1-6

Examples (EX.) 1 through 6 are prepared by injection molding the compositions of TABLE 1. The first polymeric component (a polypropylene homopolymer), the second polymeric component (a propylene-ethylene elastomer), and the reinforcement concentrate (containing long glass fiber and additional first polymeric component polypropylene) are dry blended and then introduced into a DEMAG 100 injection molding machine, in which they are melt-blended (i.e., the solid, dry-blended pellets, after being introduced into the screw of the injection molding machine melt and become blended) prior to injection into a mold cavity for forming the test samples. The data in TABLE 1 illustrates the expected results.

TABLE 1

|  | Method | Units | EX. 1 | EX. 2 | EX. 3 | EX. 4 | EX. 5 | EX. 6 |
|---|---|---|---|---|---|---|---|---|
| Ingredient |  |  |  |  |  |  |  |  |
| Reinforcement Concentrate-A |  |  | 42 | 42 | 42 | 42 | 42 | 42 |
| Elastomer A |  |  | 44.9 | 25 | 15 |  |  |  |
| Elastomer B |  |  |  |  |  | 58 | 42 |  |
| Elastomer C |  |  |  |  |  |  |  | 58 |
| PP-A |  |  | 13.1 |  |  |  |  |  |
| PP-B |  |  |  | 33 | 43 |  | 16 |  |
| Total |  |  | 100 | 100 | 100 | 100 | 100 | 100 |
| Property |  |  |  |  |  |  |  |  |
| Ethylene Content in Elastomer (%) |  |  | 15 | 15 | 15 | 9 | 9 | 5 |
| Average Flexural Modulus | ISO 178 | MPa | 1228 | 2252 | 2673 | 1609 | 1794 | 1861 |
| Charpy RT | ISO 179-1eU | kJ/m2 | 39 | 23 | 24 | 29 | 20 | 17 |
| Charpy −20 C. | ISO 179-1eU | kJ/m2 | 25 | 12 | 13 | 14 | 12 | 10 |

TABLE 1-continued

| | Method | Units | EX. 1 | EX. 2 | EX. 3 | EX. 4 | EX. 5 | EX. 6 |
|---|---|---|---|---|---|---|---|---|
| VICAT Softening Point - 50/5 | ISO 6603-3 | °C. | | 80 | 116 | | 87 | 97 |
| VICAT Softening Point - 120/10 | ISO 6603-3 | °C. | 120 | 162 | 164 | 126 | 160 | 160 |
| Gloss (N111 texture with micro matt) | ASTM D-542 | GU | 1.0 | 1.1 | 1.1 | 0.9 | 1.0 | 1.0 |
| Mar 6N (N111 texture with micro matt) | GMW 14688 | dGU | 0.2 | 0.3 | 0.3 | 0.2 | 0.2 | 0.2 |

Examples 7-15

EXAMPLES 7 through 15 are prepared using the same procedure as EXAMPLES 1-6, using the formulation given in TABLE 2. In addition to the first component, the second component and the reinforcement material, EXAMPLES 7 through 15 also include a color concentrate which is dry blended with the other ingredients and then introduced into the DEMAG injection molding machine. data in TABLE 2 illustrates the expected results.

S/LEP-A is a copolymer containing about 59 wt. % ethylene monomer units and about 41 wt. % octene monomer units. This ethylene elastomer has a specific gravity of about 0.868 as measured according to ASTM D792, a hardness of about 70 Shore A as measured according to ASTM D2240, a peak melting temperature of about 55° C. as measured by differential scanning calorimetry, a flexural modulus of about 14.4 MPa as measured according to ASTM D790 (using compression molded samples and tested at 2% secant), a melt flow rate of about 0.5 g/10 min as measured according to ASTM D1238 at 190° C./2.16 kg, a tensile strength at 100% strain of about 2.6 MPa as measured according to ASTM D638 at a strain rate of 510 mm/min, a tensile strength at break of about 9.5 MPa as measured according to ASTM D638 at a strain rate of 510 mm/min, a tensile elongation at break of about 810% as measured according to ASTM D638 at a strain rate of 510 mm/min, and a Vicat softening point of about 46° C. as measured according to ASTM D1525.

S/LEP-B is a copolymer containing about 59 wt. % ethylene monomer units and about 41 wt. % octene monomer units. This ethylene elastomer has a specific gravity of about 0.870 as measured according to ASTM D792, a hardness of about 66 Shore A as measured according to ASTM D2240, a

TABLE 2

| | EX. 7 | EX. 8 | EX. 9 | EX. 10 | EX. 11 | EX. 12 | EX. 13 | EX. 14 | EX. 15 |
|---|---|---|---|---|---|---|---|---|---|
| Reinforcement Concentrate-A | 42 | 42 | 42 | 42 | 42 | 42 | 42 | 42 | 42 |
| Elastomer A | 43.1 | 44.9 | 44.9 | 46.7 | | | | | |
| Elastomer B | | | | | | | | 46.7 | 54 |
| Elastomer D | | | | | 43.1 | 44.9 | 44.9 | | |
| PP-A | 10.9 | 9.1 | | 7.3 | 10.9 | 9.1 | | 7.3 | |
| PP-B | | | 9.1 | | | | 9.1 | | |
| CC-A | 4 | 4 | 4 | 4 | 4 | 4 | 4 | 4 | 4 |
| Total | 100 | 100 | 100 | 100 | 100 | 100 | 100 | 100 | 100 |
| Property, Method (Units) | | | | | | | | | |
| Ethylene Content in Elastomer (wt. %) | 15 | 15 | 15 | 15 | 12 | 12 | 12 | 9 | 9 |
| Flexural Modulus in Flow Direction, ISO 178 (MPa) | 955 | 1225 | 1225 | 888 | 1986 | 1684 | 1561 | 2044 | 1836 |
| Static Coefficient of Friction, ASTM D-1894 | 0.43 | 0.38 | 0.43 | 0.42 | 0.37 | 0.38 | 0.38 | 0.32 | 0.32 |
| Dynamic Coefficient of Friction, ASTM D-1894 | 0.35 | 0.33 | 0.38 | 0.37 | 0.31 | 0.34 | 0.33 | 0.25 | 0.28 |
| Hardness, ASTM D-2250 (Shore D) | 45 | 44 | 44 | 42 | 53 | 52 | 52 | 59 | 56 |
| Gloss (N111 texture with micro matt), ASTM D-542 (GU) | 1.4 | 1.4 | 1.3 | 1.3 | 1.3 | 1.4 | 1.3 | 1.2 | 1.2 |
| Mar 6N (N111 texture with micro matt), GMW 14688 (GU) | 0.4 | 0.4 | | | | | 0.6 | | 0.5 |
| scratch 10N (Audi K42 texture), PV3952 (dL) | | 0.2 | | | 0.16 | | 0.15 | 0.27 | 0.11 |
| Vicat Softening Point - 120/10, ISO 6603-3 (°C.) | | 88 | 84 | 80 | 104 | 105 | 112 | 135 | 119 |
| Charpy at RT, ISO 179-1eU (KJ/m$^2$) | | | | 28 | | | 15 | | 11 |
| Charpy at −20° C., ISO 179-1eU (KJ/m$^2$) | | | | 14 | | | 7 | | 6 |

Examples (EX.) 16-23

Comparative Example (C.E.) 24

Molded parts are prepared by injection molding the compositions of TABLE 3 using the same method as used in EXAMPLES 7 through 15. In EX. 16-22, the second polymeric component is a S/LEP, and specifically an ethylene-octene copolymer. EX. 23 uses a propylene-ethylene elastomer as the second polymer component. C.E. 24 is a comparative example which includes talc instead of the long glass fiber containing reinforcement concentrate.

peak melting temperature of about 59° C. as measured by differential scanning calorimetry, a flexural modulus of about 10.8 MPa as measured according to ASTM D790 (using compression molded samples and tested at 2% secant), a melt flow rate of about 5.0 g/10 min as measured according to ASTM D1238 at 190° C./2.16 kg, a tensile strength at 100% strain of about 2.3 MPa as measured according to ASTM D638 at a strain rate of 510 mm/min, a tensile strength at break of about 5.7 MPa as measured according to ASTM D638 at a strain rate of 510 mm/min, a tensile elongation at break of about 1100% as measured according to ASTM D638 at a strain rate of 510 mm/min, and a Vicat softening point of about 37° C. as measured according to ASTM D1525.

S/LEP-C is a copolymer containing about 59 wt. % ethylene monomer units and about 41 wt. % octene monomer units. This ethylene elastomer has a specific gravity of about 0.870 as measured according to ASTM D792, a hardness of about 72 Shore A as measured according to ASTM D2240, a peak melting temperature of about 60° C. as measured by differential scanning calorimetry, a flexural modulus of about 12.1 MPa as measured according to ASTM D790 (using compression molded samples and tested at 2% secant), a melt flow rate of about 30 g/10 min as measured according to ASTM D1238 at 190° C./2.16 kg, a tensile strength at 100% strain of about 3.3 MPa as measured according to ASTM D638 at a strain rate of 510 mm/min, a tensile elongation at break of about 1000% as measured according to ASTM D638 at a strain rate of 510 mm/min, and a Vicat softening point of about 41° C. as measured according to ASTM D1525.

Elastomer-A is a propylene-ethylene copolymer containing about 15 wt. % ethylene monomer units and about 85 wt. % propylene units. Elastomer-A has a specific gravity of about 0.876 as measured according to ASTM D792, a durometer hardness of about 72 Shore A and about 19 Shore D as measured according to ASTM D2240, a peak melting temperature expected between about 30° C. and about 50° C. as measured by differential scanning calorimetry, a crystallinity of about 14% as measured by differential scanning calorimetry (@10° C./min), a flexural modulus of about 8 MPa as measured according to ISO 178 (using injection molded samples and tested at 1% secant), a melt flow rate of about 8 g/10 min as measured according to ASTM D1238 at 230° C./2.16 kg, a tensile stress at yield of about 1.5 MPa as measured according to ISO 527-1, -2, a tensile stress at break of about 2.05 MPa as measured according to ISO 527-1, -2, and a tensile elongation at break of about 250% as measured according to ISO 527-1, -2.

Elastomer-B is a propylene-ethylene copolymer containing about 9 wt. % ethylene monomer units and about 91 wt. % propylene units. Elastomer-B has a specific gravity of about 0.863 as measured according to ASTM D792, a durometer hardness of about 95 Shore A and about 43 Shore D as measured according to ASTM D2240, a peak melting temperature expected at about 85° C. as measured by differential scanning calorimetry, a crystallinity of about 30% as measured by differential scanning calorimetry (@1° C./min), a flexural modulus of about 105 MPa as measured according to ISO 178 (using injection molded samples and tested at 1% secant), a melt flow rate of about 8 g/10 min as measured according to ASTM D1238 at 230° C./2.16 kg, a tensile stress at yield of about 7.0 MPa as measured according to ISO 527-1, -2, a tensile stress at break of about 15.5 MPa as measured according to ISO 527-1, -2, a tensile elongation at break of greater than about 640% as measured according to ISO 527-1, -2, and a Vicat softening point of about 64° C. as measured according to ASTM D1525.

Elastomer-C is a propylene-ethylene copolymer containing about 5 wt. % ethylene monomer units and about 95 wt. % propylene units. Elastomer-C has a specific gravity of about 0.888 as measured according to ASTM D792, a durometer hardness of about 96 Shore A and about 54 Shore D as measured according to ASTM D2240, a peak melting temperature expected at about 115° C. as measured by differential scanning calorimetry, a crystallinity of about 44% as measured by differential scanning calorimetry (@1° C./min), a flexural modulus of about 400 MPa as measured according to ISO 178 (using injection molded samples and tested at 1% secant), a melt flow rate of about 8 g/10 min as measured according to ASTM D1238 at 230° C./2.16 kg, a tensile stress at yield of about 16 MPa as measured according to ISO 527-1, -2, a tensile stress at break of about 23 MPa as measured according to ISO 527-1, -2, a tensile elongation at break of greater than about 630% as measured according to ISO 527-1, -2, and a Vicat softening point of about 98° C. as measured according to ASTM D1525.

Elastomer-D is a propylene-ethylene copolymer containing about 12 wt. % ethylene monomer units and about 88 wt. % propylene units. Elastomer-D has a specific gravity of about 0.864 as measured according to ASTM D792, a durometer hardness of about 70 Shore A as measured according to ASTM D2240, a peak melting temperature expected at about 50° C. as measured by differential scanning calorimetry, a crystallinity of about 14% as measured by differential scanning calorimetry (@10° C./min), a flexural modulus of about 32 MPa as measured according to ISO 178 (using injection molded samples and tested at 1% secant), a melt flow rate of about 25 g/10 min as measured according to ASTM D1238 at 230° C./2.16 kg, a tensile stress at yield of about 2.8 MPa as measured according to ISO 527-1, -2, a tensile elongation at break of greater than about 67% as measured according to ISO 527-1, -2, and a Vicat softening point of less than bout 30° C. as measured according to ASTM D1525.

Elastomer-E is a propylene-ethylene copolymer containing greater than about 9 wt. % ethylene monomer units and about 91 wt. % propylene units. Elastomer-E has a specific gravity of about 0.876 as measured according to ASTM D792, a durometer hardness of about 94 Shore A and about 42 Shore D as measured according to ASTM D2240, a peak melting temperature expected at about 80° C. as measured by differential scanning calorimetry, a crystallinity of about 29% as measured by differential scanning calorimetry (@10° C./min), a flexural modulus of about 108 MPa as measured according to ISO 178 (using injection molded samples and tested at 1% secant), a melt flow rate of about 25 g/10 min as measured according to ASTM D1238 at 230° C./2.16 kg, a tensile stress at yield of about 7 MPa as measured according to ISO 527-1, -2, a tensile stress at break of about 12 MPa as measured according to ISO 527-1, -2, a tensile elongation at break of greater than about 630% as measured according to ISO 527-1, -2, and a Vicat softening point of about 60° C. as measured according to ASTM D1525.

PP-A is a polypropylene homopolymer which contains at least 95 wt. % isotactic polypropylene. PP-A has a density of about 0.900 g/cm$^3$ as measured according to ISO 1183, a Charpy notched impact strength at 23° C. of about 2.5 KJ/m$^2$ as measured according to ISO 179/eA, a peak melting temperature greater than about 160° C. as measured by differential scanning calorimetry, an expected crystallinity of greater than about 50% as measured by differential scanning calorimetry, a flexural modulus of about 1650 MPa as measured according to ISO 178, a melt flow rate of about 52 g/10 min as measured according to ISO 1133 at 230° C./2.16 kg, a tensile stress at yield of about 37.0 MPa as measured according to ISO 527-1, -2, a tensile elongation at yield of about 9% as measured according to ISO 527-1, -2, and a Vicat softening point of about 156° C. as measured according to ASTM D1525.

PP-B is a polypropylene homopolymer which contains at least 95 wt. % isotactic polypropylene. PP-B has a density of about 0.90 g/cm$^3$ as measured according to ISO 1183, a Charpy notched impact strength at 23° C. of about 2.5 kJ/m$^2$ as measured according to ISO 179-1/1 eA, a peak melting temperature greater than about 156° C. as measured by differential scanning calorimetry, an expected crystallinity of greater than about 50% as measured by differential scanning calorimetry, a flexural modulus of about 1650 MPa as measured according to ISO 178, a melt flow rate of about 52 g/10 min as measured according to ISO 1133 at 230° C./2.16 kg, a tensile strength at yield of about 37 MPa as measured according to ISO 527-2, a tensile elongation at yield of about 9% as measured according to ISO 527-2, and a Vicat softening point of about 152° C. as measured according to ASTM D1525.

PP-C is a polypropylene impact copolymer which contains an isotactic polypropylene phase and an elastomeric copolymer phase. PP-A has a density of about 0.900 g/cm$^3$ as measured according to ISO 1183, a Charpy notched impact strength at 23° C. of about 4 KJ/m$^2$ as measured according to ISO 179/eA, a peak melting temperature greater than about 152° C. as measured by differential scanning calorimetry, an expected crystallinity of greater than about 45 wt. % as measured by differential scanning calorimetry, a flexural modulus of about 1450 MPa as measured according to ISO 178, a melt flow rate of about 44 g/10 min as measured according to ISO 1133 at 230° C./2.16 kg, a tensile stress at yield of about 28.0 MPa as measured according to ISO 527-1, -2, a tensile elongation at yield of about 7% as measured according to ISO 527-1, -2, and a Vicat softening point of about 152° C. as measured according to ASTM D1525.

PP-D is an impact polypropylene homopolymer which contains at least 80 wt. % isotactic polypropylene and an elastomeric copolymer phase. PP-C has a density of about 0.90 g/cm$^3$ as measured according to ISO 1183, a Charpy notched impact strength at 23° C. of about 10 kJ/m$^2$ as measured according to ISO 179-1/1 eA, a peak melting temperature greater than about 156° C. as measured by differential scanning calorimetry, an expected crystallinity of greater than about 45 wt. % as measured by differential scanning calorimetry, a flexural modulus of about 1450 MPa as measured according to ISO 178, a melt flow rate of about 12 g/10 min as measured according to ISO 1133 at 230° C./2.16 kg, a tensile strength at yield of about 28 MPa as measured according to ISO 527-2, a tensile elongation at yield of about 8% as measured according to ISO 527-2, and a Vicat softening point of about 152° C. as measured according to ASTM D1525.

CC-A is a color concentrate. CC-B and CC-C are color concentrates which contain a colorant, a UV stabilizer and a slip agent in a polypropylene carrier.

Reinforcement Concentrate-A is a concentrate containing about 60 wt. % long glass fibers and about 40 wt. % PP-B.

Reinforcement Concentrate-B, Reinforcement Concentrate-C, and Reinforcement Concentrate-D each include about 60 wt. % long glass fibers, about 2 wt. % coupling agent, about 36 wt. % polypropylene having a melt flow rate greater than about 40 g/10 min (tested according to ISO 1133 at 230° C./2.16 kg, such as PP-B), and a heat stabilizers at a concentration of less than about 2 wt. %.

The first polymeric component, the second polymeric component, and the reinforcement concentrate are dry blended and introduced into a Demag 100 injection molding machine, in which they are melt-blended prior to injection into a mold cavity for forming the test samples. The data in TABLE 3 illustrates the expected results. C.E. 24, which does not contain the long glass fibers has a low heat distortion temperature and a low Vicat softening point, as well as inferior, gloss, scratch resistance, and mar resistance properties.

D9100.05, D8507.15, and D9530.05 are ethylene/α-olefin interpolymers which are block having at least one hard block and at least plurality of soft block. These block copolymers are available commercially from Dow Chemical Company under the tradename INFUSE™ and contain ethylene and octene monomers. The properties of these interpolymers are given in TABLE 4 below.

TABLE 3

| | method | unit | EX. 16 | EX. 17 | EX. 18 | EX. 19 | EX. 20 | EX. 21 | EX. 22 | EX. 23 | C.E. 24 |
|---|---|---|---|---|---|---|---|---|---|---|---|
| COMPOSITIONS | | | | | | | | | | | |
| Reinforcement Concentrate B | | wt % | 42 | 42 | 42 | 42 | 34 | 42 | 42 | | |
| Reinforcement Concentrate C | | wt % | | | | | | | | 42 | |
| Talc | | wt % | | | | | | | | | 20 |
| S/LEP-A | | wt % | 27 | 30 | | | | | | | |
| S/LEP-B | | wt % | | | 34 | 34 | 35 | | | | 20 |
| S/LEP-C | | wt % | | | | | | 27 | 27 | | |
| Elastomer-B | | wt % | | | | | | | | 25 | |
| PP-C (copoly) | | wt % | | 24 | 20 | | | | 27 | | 56 |
| PP-B (homo) | | wt % | 27 | | | 20 | 37 | 27 | | 33 | |
| CC-B | | wt % | 4 | 4 | 4 | 4 | 4 | 4 | 4 | 4 | 4 |
| Total | | wt % | 100 | 100 | 100 | 100 | 100 | 100 | 100 | 100 | 100 |
| PROPERTIES | | | | | | | | | | | |
| Ethylene Content in S/LEP or Elastomer-A | | wt % | 58.7 | 58.7 | 58.8 | 58.8 | 58.8 | 58.6 | 58.6 | 15 | 58.8 |
| Notched Charpy impact strength at about 23° C. | ISO 179-1eU | kJ/m$^2$ | 24 | 30 | 23 | 19 | 12 | 8.8 | 36 | 23 | 35 |
| Average Flexural Modulus | ISO 178 | MPa | 2128 | 1929 | 2185 | 1569 | 2132 | 1995 | 1739 | 2252 | 1500 |

TABLE 3-continued

| | method | unit | EX. 16 | EX. 17 | EX. 18 | EX. 19 | EX. 20 | EX. 21 | EX. 22 | EX. 23 | C. E. 24 |
|---|---|---|---|---|---|---|---|---|---|---|---|
| Heat Distortion Temperature 1.82 | ISO 75 | °C. | 112 | 96 | 90 | 81 | 117 | 100 | 80 | 80 | 53 |
| Vicat Softening Point | ISO 306A | °C. | 156 | 144 | 146 | 123 | 157 | 147 | 137 | 162 | 115 |
| Gloss 60° (N111 texture with micro matt) | ASTM D-542 | GU | 1.1 | 1.1 | 1.1 | 1.1 | 1.2 | 1.2 | 1.3 | 1.1 | 1.4 |
| gloss 85° (N111 texture with micro matt) | ASTM D-542 | GU | 0.8 | 0.8 | 0.7 | 0.7 | 0.9 | 0.9 | 1 | 0.8 | 1.2 |
| gloss 85° (MT10407 Volvo grain) | ASTM D-542 | GU | 1.5 | 1.5 | 1.5 | 1.6 | 1.6 | 1.5 | 1.6 | 1.5 | 1.9 |
| Mar 6N, 60° (N111 texture with micro matt) | GMW 14688 | dGU | 0.3 | 0.2 | 0.3 | 0.3 | 0.4 | 0.3 | 0.3 | 0.3 | 0.8 |
| Mar 6N, 85° (N111 texture with micro matt) | GMW 14688 | dGU | 0.9 | 0.8 | 0.9 | 0.8 | 1.1 | 0.8 | 0.7 | 0.8 | 1.1 |
| scratch - 18 N (MT10407 | PV3952 | dL | −0.1 | −0.1 | 0 | 0 | 0 | 1.9 | 1.2 | 0.2 | 0.3 |

TABLE 4

| | Ethylene/α-olefin Interpolymer - Block Copolymer | | |
|---|---|---|---|
| Property, Test Method (Units) | D9100.05 | D9507.15 | D9530.05 |
| Melt Flow Rate, ASTM D1238 @190° C./2.15 kg (g/10 min) | 1 | 5 | 5 |
| Durometer Hardness, ASTM D2240 (Shore A) | 75 | 59 | 86 |
| Concentration of Hard Blocks (wt. %) | 27.3 | 12.4 | 40.8 |
| Comonomer type | octene | octene | octene |
| Density, ASTM D792 (g/cm$^3$) | 0.88 | 0.87 | 0.89 |
| Flexural Modulus 2% secant, ASTM D790 (MPa) | 19 | 14 | 56 |
| Melting Temperature, DSC @10° C./min (° C.) | 120 | 119 | 119 |
| Ultimate Tensile Elongation, ASTM D638 (%) | 2510 | 1607 | 701 |

Examples 25 through 31

Molded parts are prepared by injection molding the compositions of TABLE 5 using the same method as used in EXAMPLES 7 through 15. In EX. 25-31, the second polymeric component is a propylene-ethylene elastomer.

The first polymeric component, the second polymeric component, and the reinforcement concentrate are dry blended and introduced into a Demag 100 injection molding machine, in which they are melt-blended prior to injection into a mold cavity for forming the test samples. The data in TABLE 5 illustrates the expected results.

Examples 32 through 35

Molded parts are prepared by injection molding the compositions of TABLE 6 using the same method as used in EXAMPLES 32 includes a propylene-ethylene elastomer, EX. 33 includes an S/LEP, EX. 34 includes a block copolymer, and EX. 35 includes Nordel™ IP4770P elastomer, commercially available from The Dow Chemical Company.

Nordel™ IP4770P is an ethylene propylene diene polymer (EPDM rubber) containing about 70 wt. % ethylene, about 25 wt. % propylene and about 5 wt. % of a diene (such as ethylidenenorbornene). Nordel IP4770P is a random copolymer and has a Mooney Viscosity of about 70 as measured according to ASTM D1646 at ML1_4 @125° C. (and an expected melt index as measured according to ISO 1133 at 190° C./2.16 kg of less than about 0.2 g/10 min).

The first polymeric component, the second polymeric component, and the reinforcement concentrate are dry blended and introduced into a Demag 100 injection molding machine, in which they are melt-blended prior to injection into a mold cavity for forming the test samples. The data in TABLE 6 illustrates the expected results.

TABLE 5

| | EX. 25 | EX. 26 | EX. 27 | EX. 28 | EX. 29 | EX. 30 | EX. 31 |
|---|---|---|---|---|---|---|---|
| Ingredient | | | | | | | |
| Reinforcement Concentrate-D | 42 | 42 | 42 | 42 | 42 | 42 | 42 |
| D9500.01 | 30 | 40 | | | | | |
| D9507.15 | | | 30 | 40 | | | |
| D9530.05 | | | | | 30 | 30 | 40 |
| PP-B | 24 | 14 | 24 | 14 | 24 | | 14 |
| PP-C | | | | | | 24 | |
| CC-B | 4 | 4 | 4 | 4 | 4 | 4 | 4 |
| Total, wt. % | 100 | 100 | 100 | 100 | 100 | 100 | 100 |

TABLE 5-continued

| Property, Method (Units) | EX. 25 | EX. 26 | EX. 27 | EX. 28 | EX. 29 | EX. 30 | EX. 31 |
|---|---|---|---|---|---|---|---|
| Notched Charpy Impact Strength at about 23° C., ISO 179 1eU (kJ/m$^2$) | 16 | 25 | 22 | 22 | 20 | 26 | 21 |
| Notched Charpy Impact Strength at about −20° C., ISO 179 1eU (kJ/m$^2$) | 12 | 19 | 19 | 19 | 9 | 12 | 10 |
| Average Flexural Modulus, ISO 178 (MPa) | 2017 | 1254 | 1947 | 1196 | 2078 | 1644 | 1483 |
| Heat Distortion Temperature @1.8 MPa, ISO 75 (°C.) | 95.2 | 72.3 | 99.9 | 63.5 | 108 | 104 | 93 |
| Vicat Softening Point, ISO 306A (°C.) | 139.1 | 98.7 | 144 | 99 | 142 | 129 | 118 |
| Scratch 18N MT 10407, ASTM D-542 (dL) | 0.0 | −0.5 | 0.4 | 0.1 | 0 | 0 | −0.4 |
| Mar 7N N111 @85°, ASTM D-542 (dGU) | 0.7 | 0.5 | 0.7 | 0.4 | 0.4 | 0.4 | 0.4 |
| Gloss N111 @85°, ASTM D-542 (GU) | 0.8 | 0.8 | 0.8 | 0.8 | 0.9 | 0.8 | 0.8 |

Examples 36 Through 39 and Comparative Example 40

Molded parts are prepared by injection molding the compositions of TABLE 7 using the same method as used in EXAMPLES 7-15. EXAMPLE 36 includes a propylene-ethylene elastomer, and EXAMPLES. 37-39 includes an S/LEP. C.E. 40 contains SOFTELL CA02A, which is a rubbery $C_2$-$C_3$ copolymer having a C2 content of about 40 wt. % and a $C_3$ content of about 60 wt. % and is obtainable from Bassell in Italy. These Examples also include a color concentrate (CC-C), Orevac CA® 100 which is a maleic anhydride grafted polypropylene available from Arkema Inc (Philadelphia, Pa., USA)., and CMPP 13.00 is a concentrate of an additives package including a heat stabilizer in a thermoplastic carrier.

TABLE 6

| Ingredient | EX 32 | EX. 33 | EX. 34 | C. E. 35 |
|---|---|---|---|---|
| Reinforcement Concentrate-D | 42 | 42 | 42 | 42 |
| S/LEP B (ethylene-octene) | | 34 | | |
| Elastomer-B (propylene-ethylene) | 54 | | | |
| Infuse D9100.05 (ethylene-propylene block copolymer) | | | 30 | |
| Nordel IP 4770P (EPDM) | | | | 40 |
| PP-B (PP homopolymer, 52 MFR) | | 20 | 24 | 14 |
| CC-B (color concentrate) | 4 | 4 | 4 | 4 |
| Total, wt. % | 100 | 100 | 100 | 100 |
| Property, Method (Units) | | | | |
| Charpy Impact Strength at RT, ISO 179 1eU (kJ/m$^2$) | 29 | 19 | 16 | 20 |
| Average Flexural Modulus, ISO 178 (MPa | 1559 | 1569 | 2017 | 1825 |
| Heat Distortion Temperature @1.8 MPa, ISO 75 (° C.) | 66 | 81 | 95 | 84 |
| Vicat Softening Point, ISO 306A (° C.) | 124 | 123 | 139 | 127 |
| Gloss N111 @85°, ASTM D-542 (GU) | 0.6 | 0.7 | 0.8 | 0.6 |
| Mar 7N N111 @85°, ASTM D-542 (dGU) | 0.5 | 0.8 | 0.7 | 0.3 |
| Scratch 18N MT, 10407ASTM D-542 (dL) | 0.1 | 0.0 | 0.11 | 0.8 |

The first polymeric component, the second polymeric component, the glass fibers, the maleic grafted PP, the color concentrate and the additives package concentrate are compounded in a twin screw extruder to blend melt-blend the materials, and then extruded into pellets or granules. The pellets or granules are then introduced into a Demag 100 injection molding machine, in which they are melted prior to injection into a mold cavity for forming the test samples.

The data in TABLE 8 illustrates the expected results for EXAMPLES 36-39 and COMPARATIVE EXAMPLE 40. Comparative Example 40 requires a high concentration of the SOFTELL CA02A to achieve a flexural modulus comparable to the flexural modulus of the samples containing the propylene elastomer or the S/LEP. Comparative Example 40 also has an undesirably low melt flow rate. The higher melt flow rates of EXAMPLES 36-39 are preferred for these polymeric compositions.

It should be understood that various ingredients may be substituted, added, or removed from the above formulations without departing from the scope of the present invention. Moreover, it is contemplated that the weight percentages of the above ingredients and the values of the properties listed may vary up to or greater than 5%, 10%, 25%, or 50% of the values listed. For example, a value of 10 may vary by 10%, which may result in a range of about 9 to about 11.

TABLE 7

| | EX. 36 | EX. 37 | EX. 38 | EX. 39 | C.E. 40 |
|---|---|---|---|---|---|
| CS EC 13 636, glass fibers | 24.96 | 24.96 | 24.96 | 20.16 | 24.96 |
| Elastomer-A | 24.96 | | | | |
| S/LEP-C | | 23.04 | | | |
| S/LEP-B | | | 28.80 | 30.72 | |
| SOFTELL CA02A | | | | | 33.60 |
| PP-B | 43.78 | | | | |
| PP-D | | 46.66 | 40.90 | | 36.10 |
| PP-C | | | | 43.78 | |
| Orevac ® CA100 | 1.92 | 0.96 | 0.96 | 0.96 | 0.96 |
| CMPP 13.00 | 0.38 | 0.38 | 0.38 | 0.38 | 0.38 |
| CC-C | 4.00 | 4.00 | 4.00 | 4.00 | 4.00 |
| | 100.00 | 100.00 | 100.00 | 100.00 | 100.00 |

TABLE 8

| Property, Method (Units) | EX. 36 | EX. 37 | EX. 38 | EX. 39 | C.E. 40 |
|---|---|---|---|---|---|
| Density, g/cm³ | | 1.08 | | | |
| Melt Flow Rate, ISO 1133 230° C./2.16 kg (g/10 min) | 13.9 | 8.9 | 6.1 | 14 | 2.3 |
| n. Charpy Impact @RT, ISO 179 1eU (kJ/m²) | 24 | 30 | 37 | 30 | 27 |
| Average Flexural Modulus, ISO 178 (MPa | 1630 | 1630 | 1301 | 1124 | 1455 |
| Heat Distortion Temperature @1.8 MPa, ISO 75 (°C.) | 57 | 53 | 48 | 51 | 52 |
| Vicat Softening Temperature, ISO 306A (° C.) | 154 | 131 | 126 | 114 | 142 |
| Gloss before Mar @85°, ASTM D-542 (GU) | 1.0 | 0.9 | 0.9 | 0.9 | 1.0 |
| Mar 7N N111 @85°, ASTM D-542 (dGU) | 0.5 | 0.3 | 0.3 | 0.4 | 0.6 |
| Gloss N111 MM@85°, ASTM D-542 (GU) | 1.2 | 1.3 | 1.3 | 1.2 | 1.1 |
| Gloss MT10407 @85°, ASTM D-542 (GU) | 1.5 | 1.5 | 1.5 | 1.5 | 1.3 |
| Scratch 18N MT 10407, ASTM D-542 (dL) | 0.0 | −0.5 | −0.7 | −0.2 | 0.2 |

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A soft-touch feel polymeric composition, wherein the composition is a blend consisting of:
   (a) a first polymeric component including a relatively hard thermoplastic having a melt flow rate from about 1 to about 60 g/10 min as measured according to ASTM D-1238 at 230° C./216 kg;
   (b) a second polymeric component, wherein the second polymeric component is a relatively soft thermoplastic as compared with the first polymeric component, and the second polymeric component consists of a propylene elastomer and a substantially linear or linear ethylene polymer (S/LEP), wherein the S/LEP comprises an α-olefin comonomer having from 4 through 20 carbon atoms and having an ethylene concentration from about 40 wt % to about 85 wt. % based on the total weight of the S/LEP, and the propylene elastomer includes propylene and one or more α-olefin comonomers having 2, or 4 through 20 carbon atoms and has a comonomer concentration less than about 20 wt. % based on the total weight of the propylene elastomer;
   (c) a reinforcement material including a glass fibers;
   (d) a coupling agent; and (e) optionally one or more additives selected from the group consisting of a cross-linking agent, a cross-linking coagent, a flame retardant, an ignition resistant additive, a stabilizer, a blowing agent, a blowing agent activator, a colorant, an antioxidant, a mold release agent, an anti-static agent, a nucleating agent, a clarifying agent, and any combinations thereof; wherein the mold release agent is a compound including an amine or amide group;

wherein the relatively hard thermoplastic is present at a concentration of less than 40 weight percent based on the total weight of the polymeric composition;

wherein the polymeric composition has an overall ethylene concentration from about 2 to about 10 wt. % based on the total weight of the composition.

2. The polymeric composition of claim 1, wherein the first polymeric component is present in the amount greater than about 3 percent by weight, based on the total weight of the composition, and the glass fibers are present from about 5 wt. % to about 40 wt. % based on the total weight of the polymeric composition.

3. The polymeric composition of claim 2, wherein the first polymeric component includes a polypropylene homopolymer, a polypropylene impact copolymer, or both, and the second polymeric component is present in the amount from about 20 wt. % to about 90 wt. % based on the total weight of the composition.

4. The polymeric composition of claim 3, wherein the S/LEP has an ethylene concentration of less than 70% by weight, the S/LEP has a melt index of about 60 g/10 min or less as measured according to ASTM D-1239-04 at 190° C./2.16 kg, and the polymeric composition has a mar of less than 2 GU when measured according to GMW 14688 at 6N.

5. The polymeric composition of claim 4 wherein the soft thermoplastic includes an S/LEP having a density from about 0.850 to about 0.900 g/cm$^3$, and a melt index from 1.0 to about 40 g/10 min, as measured according to ASTM D-1238-04 at 190° C., 2.16 kg.

6. The polymeric composition of claim 4 wherein the S/LEP is characterized by
i) a melt flow ratio, $I_{10}/I_2, \geq 5.63$,
ii) a molecular weight distribution, $M_w/M_n$, defined by the equation:

$$M_w/M_n \leq I_{10}/I_2 - 4.63, \text{ and}$$

iii) a critical shear stress at onset of gross melt ftacture of greater than about $4 \times 10^6$ dyne/cm$^2$.

7. The polymeric composition of claim 4 wherein the S/LEP is characterized by one or any combination of the following:
(i) a density of 0.85-0.92 g/cm$^3$,
(ii) an intrinsic viscosity [η] of 0.1-10 dl/g as measured in decalin at 135° C., (iii) a ($M_w/M_n$) ratio of a weight average molecular weight ($M_w$) to a nurmber average molecular weight ($M_n$) of 1.2-4 as measured by GPC, or
(iv) a (MFR10/MFR2) ratio of MFR10 under a load of 10 kg to MFR2 under a load of 2.16 kg of 8-50 as measured at 190° C. wherein MFR10 and MFR2 are measured according to ASTM D-1238 at 190° C. with a load of 10 kg and 2.16 kg respectively.

8. The polymeric composition of claim 4, wherein the S/LEP has a Shore A hardness of about 65 to about 95 according to ASTM D-2240.

9. The polymeric composition of claim 3 wherein the ratio of the first polymeric component to the second polymeric component ranges from about 10:42 to about 10:5 and the polymeric composition has a mar of less than 2 GU when measured according to GMW 14688 at 6N).

10. The polymeric composition of claim 3 wherein the ratio of the first polymeric component to the second polymeric component is from about 10:27 to about 10:5.

11. The polymeric composition of claim 3, wherein the propylene elastomer is a propylene-ethylene copolymer having an ethylene concentration from about 4 to about 20 wt. % based and a propylene concentration from about 80 wt. % to about 96 wt. % based on the total weight of the propylene elastomer.

12. The polymeric composition of claim 11 wherein the propylene elastomer is a low elasticity ethylene-propylene copolymer (LEEP copolymer) wherein the LEEP copolymer has one or any combination of the following characteristics:
(i) a melting point ranging from an upper limit of less than 110° C. to a lower limit of greater than 25° C.;
(ii) a relationship of elasticity to 500% tensile modulus such that Elasticity $\leq 0.935M + 12$ where elasticity is in percent and M is the 500% tensile modulus in megapascal (MPa);
(iii) a relationship of flexural modulus to 500% tensile modulus such that Flexural Modulus $\leq 4.2e^{0.27M} + 50$ where flexural modulus is in MPa and M is the 500% tensile modulus in MPa;
(iv) a heat of fusion ranging from a lower limit of greater than 1.0 joule to an upper limit of less than 125 J/g;
(v) a triad tacticity as determined by carbon-13 nuclear magnetic resonance ($^{13}$C NMR) of greater than 75%;
(vi) a tacticity index m/r arranging from a lower limit of 4 an upper limit of 12;
(vii) a proportion of inversely inserted propylene units based on 2.1 insertion of propylene monomer in all propylene insertions, as measured by $^{13}$C NMR, of greater than 0.5%;
(viii) a proportion of inversely inserted propylene units based on 1.3 insertion of propylene monomer in all propylene insertions, as measured by $^{13}$C NMR, of greater than 0.05%;
(ix) an intermolecular tacticity such that at least 75% by weight of the copolymer is soluble in two adjacent temperature fractions of a thermal fractionation carried out in hexane in 8° C. increments;
(x) a reactivity ratio product $r_1 r_2$ of less than 1.5;
(xi) a molecular weight distribution Mw/Mn ranging from a lower limit of 1.5 to an upper limit of 40;
(xii) a molecular weight of from 15,000-5,000,000;
(xiii) a solid state proton nuclear magnetic resonance ($^1$H NMR) relaxation time of less than 18 milliseconds (ms);
(xiv) an elasticity of less than 30%, or less than 20%, or less than 10%, or less than 8%, or less than 5%; or
(xv) a 500% tensile modulus of greater than 0.5 MPa, or greater than 0.8 MPa, or greater than 1.0 MPa, or greater than 2.0 MPa.

13. The composition of claim 11, wherein
the second polym=eric component includes the propylene elastomer, and propylene elastomer is a regio-error ethylene-propylene copolymer (R-EPE copolymer) wherein the R-EPE copolymer has one or any combination of the following characteristics:
i) at least about 0.1 weight percent of units derived from ethylene, and having $^{13}$C NMR peaks corresponding to a regio-error at about 14.6 and about 15.7 ppm, the peaks of about equal intensity;
ii) at least about 60 weight percent of units derived from propylene and at least about 0.1 weight percent of units derived from ethylene, and having a skewness index, $S_{ix}$, greater than about −1.20;

iii) at least about 60 weight percent of units derived from propylene and at least about 0.1 weight percent of units derived from ethylene, and having a DSC curve with a $T_{me}$ that remains essentially the same and a $T_{max}$ that decreases as the amount of ethylene in the copolymer is increased;

iv) at least about 60 weight percent of units derived from propylene and at least about 0.1 weight percent of units derived from ethylene, and having an X-ray diffraction pattern exhibiting more gamma-form crystals than a propylene/ethylene copolymer comparable in weight average molecular weight except that it is prepared with a Ziegler-Natta catalyst; or v) at least about 60 weight percent of units derived from propylene and at least about 0.1 weight percent of units derived from ethylene, and having a B-value greater than about 1.4 when the ethylene content of the R-EPE copolymer is at least about 3 weight percent.

14. The polymeric composition of claim 13 wherein the first polymeric component includes a polypropylene homopolymer, a polypropylene impact copolymer, or both.

15. The polymeric composition of claim 1, wherein the S/LEP is present at a concentration from about 20 to about 45 wt. % based on the total weight of the polymeric composition.

16. The polymeric composition of claim 15, wherein the first polymeric component includes a polypropylene homopolymer, a polypropylene random copolymer, a polypropylene impact copolymer, or any combination thereof.

17. The polymeric composition of claim 16, wherein the first polymeric component includes a polypropylene homopolymer present at a concentration from about to less than 40 wt. % based on the total weight of the polymeric composition.

18. The polymeric composition of claim 1, wherein the S/LEP is an ethylene-octene copolymer having from about 50 to about 70 wt. % ethylene based on the total weight of the ethylene-octene copolymer and the ethylene-octene copolymer has a melt flow rate from about 1 to about 30 g/10 min as measured according to ASTM D-1238 (at 190° C., 2.16 kg).

19. The polymeric composition of claim 1, wherein the S/LEP has a melt index of about 60 g/10 min or less as measured according to ASTM D-1238-04 at 190° C./2.16 kg, wherein the ratio of the first polymeric component to the second polymeric component ranges from about 10:42 to about 10:5, and the polymeric composition has a mar of less than 2 GU when measured according to GMW 14688 at 6N).

20. The polymeric composition of claim 19 wherein the S/LEP has a density from about 0.850 to about 0.900 g/cm$^3$, and a melt index from about 0.2 to about 40 g/10 min, as measured according to ASTM D-1238-04 at 190° C., 2.16 kg.

21. The polymeric composition of claim 20, wherein the S/LEP is present at a concentration from about 20 to about 45 wt % based on the total weight of the polymeric composition.

22. The polymeric composition of claim 19 wherein the S/LEP is characterized by i) a melt flow ratio, $I_{10}/I_2 \geq 5.63$, ii) a molecular weight distribution, $M_w/M_n$, defined by the equation:

$$M_w/M_n \leq I_{10}/I_2 - 4.63, \text{ and}$$

iii) a critical shear stress at onset of gross melt fracture of greater than about $4 \times 10^6$ dyne/cm$^3$.

23. The polymeric composition of claim 19 wherein the S/LEP is characterized by one or any combination of the following:

(i) a density of 0.8-0.92 g/cm$^3$, (ii) an intrinsic viscosity [η] of 0.1-10 dl/g as measured in decalin at 135° C., (iii) a ($M_w/M_n$) ratio of a weight average molecular weight ($M_w$) to a number average molecular weight ($M_n$) of 1.2-4 as measured by GPC, or (iv) a (MFR10/MFR2) ratio of MFR10 under a load of 10 kg to MFR2 under a load of 2.16 kg of 8-50 as measured at 190° C. wherein MFR10 and MFR2 are measured according to ASTM D-1238 at 190° C. with a load of 10 kg and 2.16 kg respectively.

24. The polymeric composition of claim 19, wherein the ratio of the first polymeric component to the second polymeric component is about 10:27 or more.

25. The polymeric composition of claim 24, wherein the polymeric composition has an overall ethylene concentration from about 2 to about 10 wt. % based on the total weight of the polymeric composition, and the propylene elastomer has a melt flow rate of about 150 g/10 min or less as measured according to ASTM D-1238 at 23° C./2/16 kg.

26. The polymeric composition of claim 25 wherein the propylene elastomer is a low elasticity ethylene-propylene copolymer (LEEP copolymer) wherein the LEEP copolymer has one or any combination of the following characteristics:

(i) a melting point ranging from an upper limit of less than 110° C. to a lower limit of greater than 25° C.;

(ii) a relationship of elasticity to 500% tensile modulus such that Elasticity $\geq 0.935M+12$ where elasticity is in percent and M is the 500% tensile modulus in megapascal (MPa);

(iii) a relationship of flexural modulus to 500% tensile modulus such that Flexural Modulus $\leq 4.2e^{0.27N}+50$ where flexural modulus is in MPa and M is the 500% tensile modulus in MPa;

(iv) a heat of fusion ranging from a lower limit of greater than 1.0 joule to an upper limit of less than 125 J/g;

(v) a triad tacticity as determined by carbon-13 nuclear magnetic resonance ($^{13}$C NMR) of greater than 75%;

(vi) a tacticity index m/r ranging from a lower limit of 4 an upper limit of 12;

(vii) a proportion of inversely inserted propylene units based on 2.1 insertion of propylene monomer in all propylene insertions, as measured by C NMR, of greater than 0.5%;

(viii) a proportion of inversely inserted propylene units based on 1.3 insertion of propylene monomer in all propylene insertions, as measured by $^{13}$C NMR, of greater than 0.05%;

(ix) an intermolecular tacticity such that at least 75% by weight of the copolymer is soluble in two adjacent temperature fractions of a thermal fractionation carried out in hexane in 8° C. increments;

(x) a reactivity ratio product $r_1 r_2$ of less than 1.5;

(xi) a molecular weight distribution Mw/Mn ranging from a lower limit of 1.5 to an upper limit of 40;

(xii) a molecular weight of from 15,000-5,000,000;

(xiii) a solid state proton nuclear magnetic resonance ($^1$H NMR) relaxation time of less than 18 milliseconds (ms);

(xiv) an elasticity of less than 30%, or less than 20%, or less than 10%, or less than 8%, or less than 5%; or (xv) a 500% tensile modulus of greater than 0.5 MPa, or greater than 0.8 MPa, or greater than 1.0 MPa, or greater than 2.0 MPa.

27. The polymeric composition of claim 25 wherein the propylene elastomer is a regio-error ethylene-propylene copolymer (R-EPE copolymer) wherein the R-EPE copolymer has one or any combination of the following characteristics:
- i) at least about 0.1 weight percent of units derived from ethylene, and having $^{13}$C NMR peaks corresponding to a regio-error at about 14.6 and about 15.7 ppm, the peaks of about equal intensity;
- ii) at least about 60 weight percent of units derived from propylene and at least about 0.1 weight percent of units derived from ethylene, and having a skewness index, $S_{ix}$, greater than about −1.20;
- iii) at least about 60 weight percent of units derived from propylene and at least about 0.1 weight percent of units derived from ethylene, and having a DSC curve with a $T_{me}$ that remains essentially the same and a $T_{max}$ that decreases as the amount of ethylene in the copolymer is increased;
- iv) at least about 60 weight percent of units derived from propylene and at least about 0.1 weight percent of units derived from ethylene, and having an X-ray diffraction pattern exhibiting more gamma-form crystals than a propylene/ethylene copolymer comparable in weight average molecular weight except that it is prepared with a Ziegler-Natta catalyst; or
- v) at least about 60 weight percent of units derived from propylene and at least about 0.1 weight percent of units derived from ethylene, and having a B-value greater than about 1.4 when the ethylene content of the R-EPE copolymer is at least about 3 weight percent.

28. The polymeric composition of claim 1, wherein the S/LEP has an ethylene concentration of less than 70 percent by weight, based on the total weight of the S/LEP.

29. The polymeric composition of claim 1, wherein the first polymeric component includes a polypropylene homopolymer, a polypropylene impact copolymer, or any combination thereof.

30. The polymeric composition of claim 1, wherein the first polymeric component includes a polypropylene homopolymer present at a concentration from about 20 to less than 40 wt. % based on the total weight of the polymeric composition.

31. The polymeric composition of claim 1, wherein the S/LEP is an ethylene-octene copolymer having from about 50 to about 70 wt % ethylene based on the total weight of the ethylene-octene copolymer and the ethylene-octene copolymer has a melt flow rate from about 1 to about 30 g/10 min as measured according to ASTM D-1238 (at 190° C., 2.16 kg).

32. The polymeric composition of claim 1, wherein the propylene elastomer includes a regio-error ethylene-propylene copolymer, and the S/LEP includes from 50 to 70 wt. % ethylene based on the total weight of the S/LEP.

33. The polymeric composition of claim 1, wherein the first polymeric component includes a polypropylene homopolymer, a polypropylene impact copolymer, or both, and the propylene elastomer includes a regio-error ethylene-propylene copolymer.

34. The polymeric composition of claim 33, wherein the concentration of the first polymeric component is greater than about 3 percent by weight, based on the total weight of the composition, the concentration of the glass fibers is 5 percent by weight to 40 percent by weight based on the total weight of the polymeric composition, and the concentration of the second polymeric component is 20 percent by weight to 90 percent by weight based on the total weight of the composition.

35. The polymeric composition of claim 34, wherein the first polymeric component includes a polypropylene homopolymer at a concentration from about 20 to less than 40 wt. % based on the total weight of the polymeric composition.

36. The polymeric composition of claim 1, wherein the S/LEP includes from 50 to 70 wt % ethylene based on the total weight of the S/LEP.

37. The polymeric composition of claim 1, wherein the first polymeric component includes a polypropylene homopolymer, a polypropylene impact copolymer, or both.

38. The polymeric composition of claim 37, wherein the concentration of the first polymeric component is greater than 3 percent by weight, based on the total weight of the composition, the concentration of the glass fibers is 5 percent by weight to 40 percent by weight based on the total weight of the polymeric composition, and the concentration of the second polymeric component is 20 percent by weight to 90 percent by weight based on the total weight of the composition.

39. A molded article having at least one part having a polymeric composition of claim 1.

40. A process for manufacturing a molded article wherein a part of the molded article has a polymeric composition of claim 1; wherein the process of manufacturing the molded article includes compression molding, injection molding, gas assisted injection molding, calendering, vacuum forming, thermoforming, extrusion, blow molding, or any combination thereof.

41. The process for manufacturing a molded article of claim 40 wherein the process comprises the steps of:
- a) providing a first material that includes at least a portion of the relatively hard thermoplastic;
- b) providing from about 10 to about 70 parts by weight a second material that includes at least a portion of the relatively soft thermoplastic selected from the group consisting of the propylene elastomer, the substantially linear or linear ethylene polymer (SLEP), or both, wherein the S/LEP comprises an α-olefin comonomer having from 4 through 20 carbon atoms and having an ethylene concentration from 40 percent by weight to 70 percent by weight based on the total weight of the S/LEP, and the propylene elastomer includes propylene and one or more α-olefin comonomers having 2, or 4 through 20 carbon atoms and has a comonomer concentration less than about 20 wt. % based on the total weight of the propylene elastomer;
- c) providing about 20 to about 75 parts by weight a third material including a reinforcement concentrate having glass fibers;
- d) blending the first, second and third materials to form a blend; and
- e) shaping the blend in a tool to form an article.

42. The process of claim 41, wherein the S/LEP has a melt index of about 60 g/10 min or less as measured according to ASTM D-1238-04 at 190° C./2.16 kg, the propylene elastomer has a melt flow rate of about 150 g/10 min or less as measured according to ASTM D-1238 at 230° C./2/6 kg, and at least a portion of the hard thermoplastic wherein the hard thermoplastic includes polypropylene.

43. The of claim 41, wherein the glass fibers are present in a concentration from about 30 wt. % to about 90 wt. % based on the total weight of the reinforcement concentrate, and the glass fibers are present in the amount of about 10 wt % to about 40 wt. % based on total weight of the molded article.

44. The process of claim 41 wherein the process further comprises a step of compounding together two or more of the first material, the second, or the third material, prior to the blending step.

45. The process of claim 41, wherein the process is substantially free of compounding the any two of the first, second, and third materials prior to the blending step, and the first polymeric component includes a polypropylene homopolymer, a polypropylene impact copolymer, or both.

46. The process of claim 40 wherein the second polymeric component comprises the propylene elastomer and the S/LEP, and the process comprises the steps of:
  a) providing a first material that includes at least a portion of the relatively hard thermoplastic;
  b) providing from about 10 to about 70 parts by weight a second material that includes at least a portion of the relatively soft thermoplastic,
  c) providing about 20 to about 75 parts by weight a third material including a reinforcement concentrate having at glass fibers;
  d) blending the first, second and third materials to form a blend; and
  e) shaping the blend in a tool to form an article; wherein the S/LEP comprises an α-olefin comonomer having from 4 through 20 carbon atoms and having an ethylene concentration from about 40 wt. % to about 85 wt. % based on the total weight of the S/LEP, and the propylene elastomer includes propylene and one or more α-olefin comonomers having 2, or 4 through 20 carbon atoms and has a comonomer concentration less than about 20 wt. % based on the total weight of the propylene elastomer.

47. The process of claim 46, wherein the reinforcement concentrate includes the glass fibers and at least a portion of the hard thermoplastic wherein the hard thermoplastic includes polypropylene.

48. The process of claim 46, wherein the glass fibers are present in a concentration from about 30 wt. % to about 90 wt. % based on the total weight of the reinforcement concentrate, and the glass fibers are present in the amount of about 10 wt % to about 40 wt. % based on total weight of the molded article.

49. A process for preparing a polymeric material of claim 2, wherein the process comprises the steps of:
  i) providing a first material comprising the relatively hard thermoplastic selected from a polypropylene homopolymer, a polypropylene impact copolymer, a polypropylene random copolymer, or any combination thereof;
  ii) providing the S/LEP, and the propylene elastomer;
  iii) providing the glass fibers;
  iv) admixing the first material, the S/LEP, the propylene elastomer, and the glass fibers to a form the polymeric composition;
  v) pelletizing the polymeric composition to form pellets or granules capable of being fed into a thermoplastic molding machine;
  and
  vi) placing at least 5 kg of the pellets or granules into a container.

50. The process of claim 49, wherein the process further comprises a step of injection molding the polymeric composition.

51. The process of claim 50 wherein the injection molding step includes a step of forming an article by a single shot injection molding.

52. A process for preparing a polymeric material of claim 2, wherein the process comprises the steps of:
  i) providing a first material comprising the relatively hard thermoplastic selected from a polypropylene homopolymer, a polypropylene impact copolymer, a polypropylene random copolymer, or any combination thereof;
  ii) providing a second material comprising the relatively soft thermoplastic selected from an S/LEP, a propylene elastomer, or both;
  iii) providing the glass fibers;
  iv) admixing the first material, the second material, and the glass fibers to a form the polymeric composition;
  v) pelletizing the polymeric composition to form pellets or granules capable of being fed into a thermoplastic molding machine; and
  vi) placing at least 5 kg of the pellets or granules into a container.

53. The process of claim 52, wherein the process further comprises a step of injection molding the polymeric composition.

* * * * *

UNITED STATES PATENT AND TRADEMARK OFFICE
CERTIFICATE OF CORRECTION

PATENT NO. : 8,338,540 B2
APPLICATION NO. : 12/256217
DATED : December 25, 2012
INVENTOR(S) : Norwin van Riel et al.

Page 1 of 1

It is certified that error appears in the above-identified patent and that said Letters Patent is hereby corrected as shown below:

Title Page, item (56) under References Cited, "2007/0066756" should be "2006/0066756"

In the Claims:

Col. 50, Claim 12, Line 29, "arranging" should be "ranging"
Col. 50, Claim 12, Line 32, "2.1" should be "2,1"
Col. 50, Claim 12, Line 36, "1.3" should be "1,3"
Col. 50, Claim 13, Line 55, "poly=eric" should be "polymeric"
Col. 51, Claim 17, Line 33, after about add "20%"
Col. 52, Claim 23, Line 4, "0.8" should be "0.85"
Col. 52, Claim 23, Line 6, "(iii)" should be paragraphed
Col. 52, Claim 25, Line 22, "23° C/2/16kg" should be "230° C/2, 16kg"

Col. 52, Claim 25, Line 30, "$\geqq$" should be "$\leqq$"
Col. 52, Claim 26, Line 44, "2.1" should be "2,1"
Col. 52, Claim 26, Line 45, "C NMR" should be "13 CNMR"
Col. 53, Claim 31, Line 44, "wt%" should be "wt.%"
Col. 54, Claim 42, Line 56, "/2/6 kg" should be "2.16 kg"

Signed and Sealed this
Twenty-third Day of April, 2013

Teresa Stanek Rea
*Acting Director of the United States Patent and Trademark Office*